US005613090A

United States Patent [19]
Willems

[11] Patent Number: 5,613,090
[45] Date of Patent: Mar. 18, 1997

[54] COMPUTER SYSTEM FOR DISPARATE WINDOWING ENVIRONMENTS WHICH TRANSLATES REQUESTS AND REPLIES BETWEEN THE DISPARATE ENVIRONMENTS

[75] Inventor: Richard A. Willems, The Woodlands, Tex.

[73] Assignee: Compaq Computer Corporation, Houston, Tex.

[21] Appl. No.: 132,141

[22] Filed: Oct. 5, 1993

[51] Int. Cl.$^6$ .................................................... G06F 3/00
[52] U.S. Cl. ........................... 395/500; 395/200.18
[58] Field of Search ............. 341/50–107; 345/118–120, 345/141–146, 153–155, 902; 395/155–161, 200, 300, 700, 800, 200.01, 200.03–200.04, 200.12, 200.18, 500, 650

[56] References Cited

U.S. PATENT DOCUMENTS

| | | | |
|---|---|---|---|
| 4,688,170 | 8/1987 | Waite et al. | 395/500 |
| 4,989,139 | 1/1991 | Friedman et al. | 395/200.02 |
| 5,133,053 | 7/1992 | Johnson et al. | 395/200.03 |
| 5,142,622 | 8/1992 | Owens | 395/200.02 |
| 5,157,763 | 10/1992 | Peters et al. | 395/157 |
| 5,208,743 | 5/1993 | Nishikawa | 364/140 |
| 5,301,268 | 4/1994 | Takeda | 395/157 |
| 5,313,581 | 5/1994 | Giokas et al. | 395/700 |
| 5,379,374 | 1/1995 | Ishizaki et al. | 395/155 |
| 5,408,602 | 4/1995 | Giokas et al. | 395/157 |

OTHER PUBLICATIONS

Smith, T. & Sperling, E. "Insignia Licenses Source Code From Microsoft." Computer Reseller News, No. 525 (May 10, 1993) p. 8(1).

Garry, G. "New Server, Wabi Gives Sun a Boost." Digital News & Review, vol. 10, No. 10 (May 17, 1993) p. 5(1).

Treadway, R. "Working with Windows." Computer Graphics World (Sep. 1988), pp. 79–80, 82–86.

*Primary Examiner*—Lance L. Barry
*Attorney, Agent, or Firm*—Keith Lutsch; James R. Burdett

[57] ABSTRACT

A computer system for disparate windowing environments includes a server which leverages as much of one windowing environment's code as possible, and uses another windowing environment's code only in cases either to remain compliant with the other windowing Environment's protocol or where the other windowing environment's code is clearly more suited for a given task. The server according to the present invention is made up of two basic components: a front end adapted for the first windowing environment, which is a network-aware application that serves up high-level application programming interfaces (e.g., create window, draw line, draw text) to a complementary component, a translation layer, running as a daemon on a UNIX machine. A custom protocol is used to communicate between the front end and the translation layer, in order to separate out functionality that can be handled ideally on a UNIX platform, such as property lists and atom management and place only the code that is absolutely necessary, such as window manipulation, rendering primitives and input event handling, on the PC. By placing code on a UNIX platform where system resources are typically not constrained, more system memory is made available on the PC. Each of the above attributes dramatically reduce system memory requirements and improve system performance.

11 Claims, 8 Drawing Sheets

COMPUTER SYSTEM FOR DISPARATE WINDOWING ENVIRONMENTS WHICH TRANSLATES REQUESTS AND REPLIES BETWEEN THE DISPARATE ENVIRONMENTS

BACKGROUND OF THE INVENTION

1. Field of the Invention

The present invention is related generally to graphical user interfaces (GUIs), and more particularly to a personal computer in a computer network which is capable of seamlessly running disparate GUIs and their applications without requiring extraneous system resources.

2. Statement of the Prior Art

Market studies have shown that Microsoft Corporation has shipped nearly eighteen million copies of its "WINDOWS 3.0" operating system in the past two years. Given its popularity and low hardware requirements, "WINDOWS" has become the predominate GUI on desktop personal to computers (PCs). In the "UNIX" environment, however, "X WINDOWS" is considered to be the defacto standard for applications requiring graphics. A major problem with "X WINDOWS" is that it requires system resources typically not found on the desktop PC; for example, a "UNIX" operating system, a large disk drive and fast central processing unit (CPU). As a result, more sophisticated hardware than can be found on the basic desktop PC is needed to run "X WINDOWS" applications.

Currently, several third party vendors offer "X WINDOWS" interoperability in the "MICROSOFT WINDOWS" environment. The approach most commonly taken is to modify the MIT X server code so that it will run under "WINDOWS". While this technique is a popular one, it has several flaws, the most notable of which is that a vast majority of the "MICROSOFT WINDOWS" code is not exploited and, instead, the "X WINDOWS" code is used. This problem is further exacerbated by the fact that the "X WINDOWS" code is not frugal when it comes to system resources such as system memory (i.e., random access memory or RAM) and CPU cycles. Furthermore, "X WINDOWS" is designed to run on a myriad of hardware, ranging from one-bit monochrome to 24-bit true color systems, and with a multitude of keyboards and mice, all of which adds to the system's overhead. As a result, a typical desktop PC can not be used as an "X WINDOWS" workstation.

Accordingly, it is a general object of the present invention to leverage off of the success of "MICROSOFT WINDOWS" by providing a nearly seamless integration of "X WINDOWS" applications in the "MICROSOFT WINDOWS" environment, thereby broadening the market exposure of "UNIX" and "UNIX" servers.

It is a more specific object of the present invention to provide a server which is capable of using a minimum amount of system resources on the desktop to perform a particular task.

Another object of the present invention is to provide a server which is capable of providing fast rendering and window manipulation of "X WINDOWS" applications.

Yet another object of the present invention is to provide a server which is capable of running as many existing "X WINDOWS" applications (e.g., X11R4) as possible without re-linking or re-compiling and without compromising performance.

Still another object of the present invention is to provide a server which is capable of providing nearly seamless integration of "X WINDOWS" applications into the "MICROSOFT WINDOWS" environment.

A further object of the present invention is to provide a server which is capable of moving easily from "WINDOWS 3.1" to "WINDOWS NT".

SUMMARY OF THE INVENTION

These and other objects of the present invention are accomplished by a server which leverages as much of the "MICROSOFT WINDOWS" code as possible, and uses the "X WINDOWS" code only in cases either to remain X11R4 compliant or where the X code is clearly more suited for a given task. The strategy is to separate out functionality that can be handled ideally on a "UNIX" platform, such as property lists and atom management and place only the code that is absolutely necessary, such as window manipulation, rendering primitives and input event handling, on the PC. By placing code on a "UNIX" platform where system resources are typically not constrained, more system memory is made available on the PC. In addition, the server according to the present invention embraces high-level "MICROSOFT WINDOWS" application programming interfaces (APIs) to perform such tasks as creating a window, mapping a color or displaying text. It also enlists the help of the Microsoft window manager to manipulate the "X WINDOWS" applications. Each of the above attributes dramatically reduce system memory requirements and improve system performance.

The server according to the present invention comprises two basic components: a "WINDOWS" front end, which is a network-aware "MICROSOFT WINDOWS" application that "serves up" high-level "MICROSOFT WINDOWS" APIs (e.g., create window, draw line, draw text) to a complementary component, a translation layer, running as a daemon on a "UNIX" machine. A custom protocol is used to communicate between the "WINDOWS" front end and the translation layer.

An "X WINDOWS" application wishing to run on a PC connects to the translation layer like a normal X client. In fact, from the viewpoint of the application, the translation layer behaves as if it were an X server. As X requests are submitted to the translation layer, they are parsed, parameter checked, and then dispatched to mapping routines where they are converted to "MICROSOFT WINDOWS" front end requests. The converted requests are then transmitted to the "WINDOWS" front end via a first network protocol. The "WINDOWS" front end honors the requests by issuing the appropriate "MICROSOFT WINDOWS" APIs. Alternately, messages sent to the "WINDOWS" front end by the local Microsoft window manager are converted to CPQ events and are submitted to the translation layer. The translation layer then converts the CPQ events to X events and delivers them to the "X WINDOWS" application. In a similar manner, errors generated by faulty requests to the "WINDOWS" front end are sent to the translation layer where they are converted to X errors which are then propagated to the "X WINDOWS" application.

The above, and other objects, advantages and novel features according to the present invention will become more apparent from the following detailed description of the invention when considered in conjunction with the accompanying drawings wherein:

DETAILED DESCRIPTION OF THE INVENTION

Figure 1:
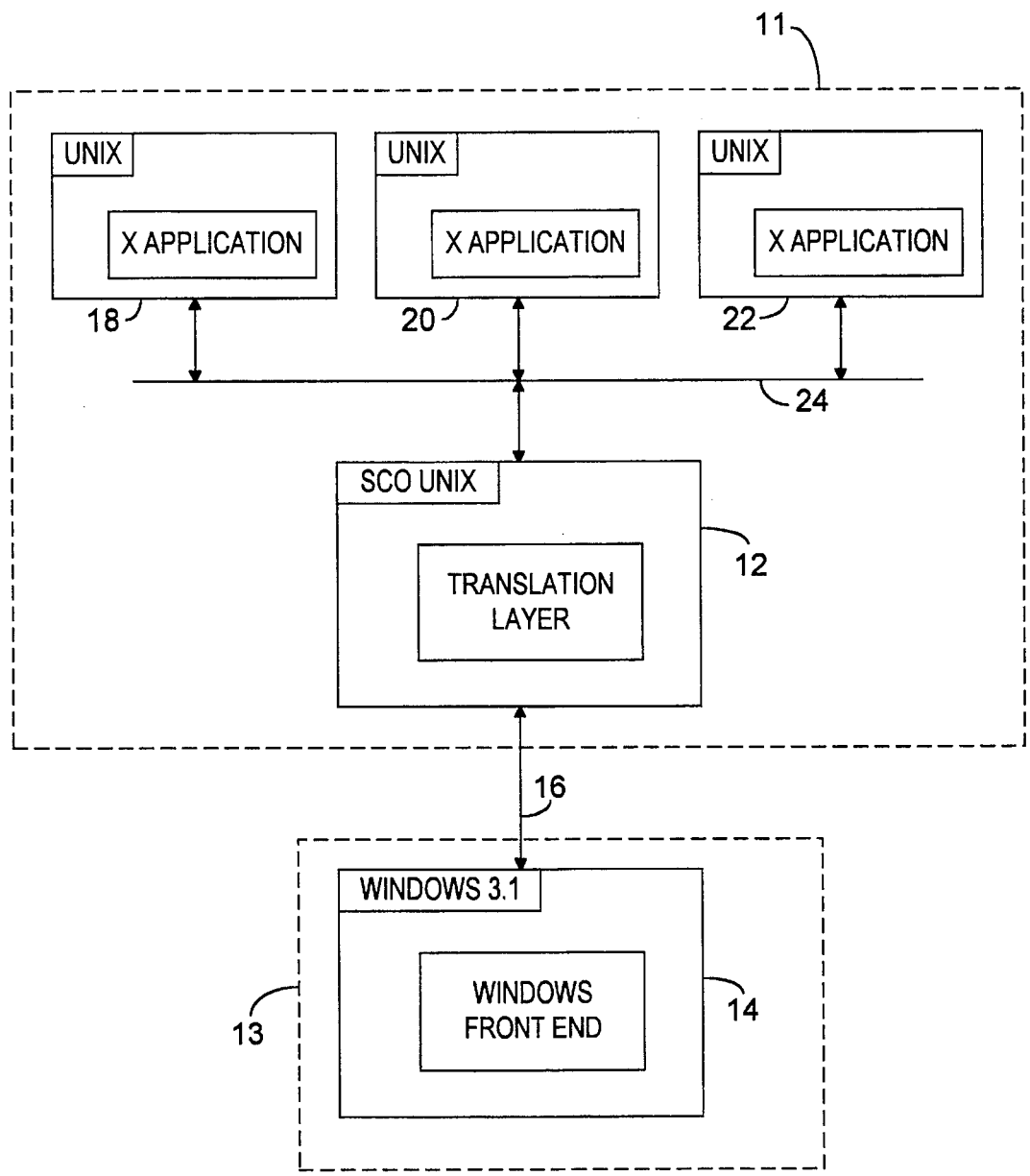
FIG. 1 is a block diagram of the server according to one embodiment of the present invention.

Referring now to the drawings, wherein like numbers designate like or corresponding parts throughout the several views, there is shown in FIG. 1 a CPQ server 10 according to the present invention. CPQ server 10 generally comprises a translation layer 12 and a "WINDOWS" front end 14, connected together by a CPQ protocol interface 16.

Figure 2:
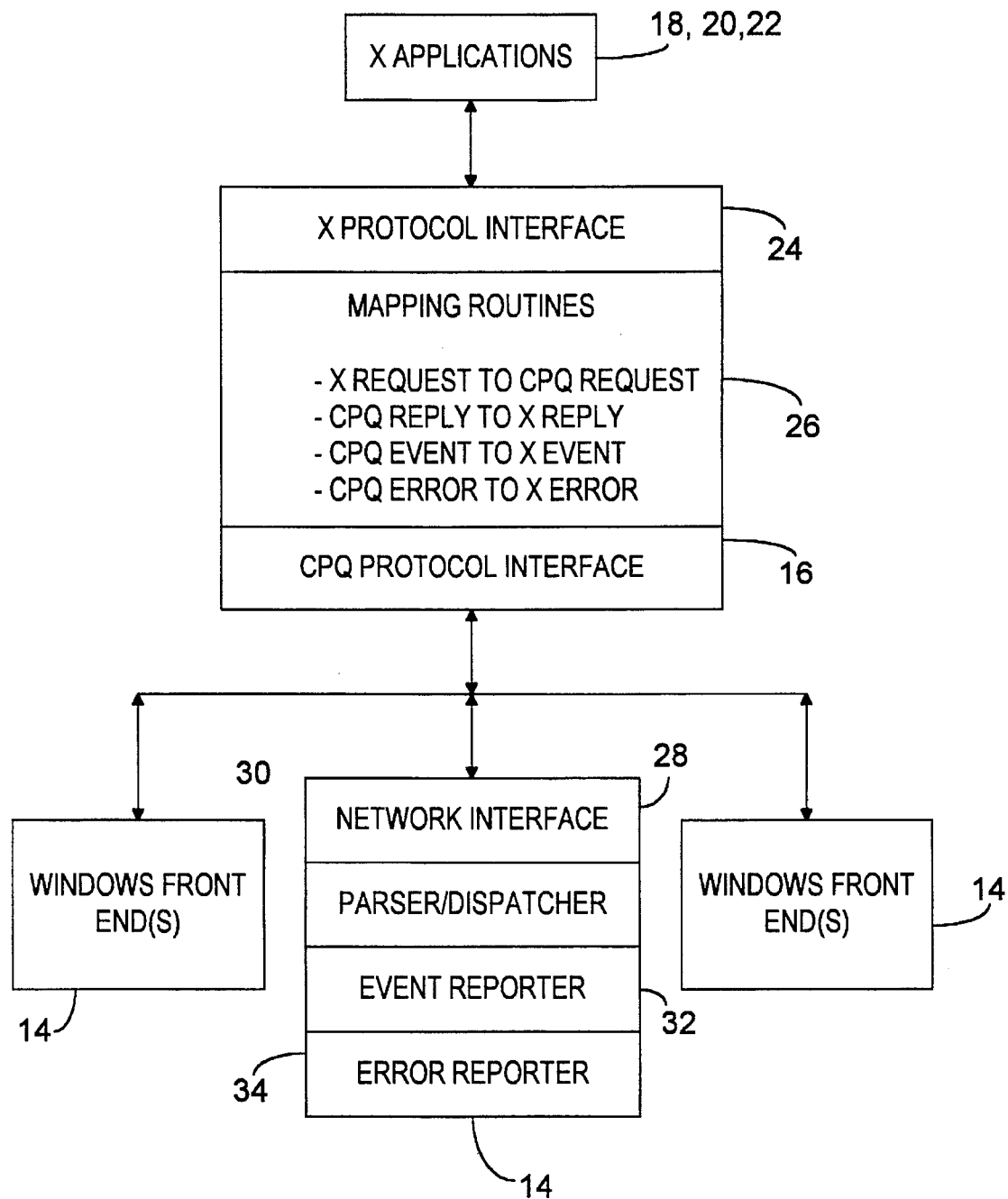
FIG. 2 illustrates in greater detail the translation layer shown in FIG. 1.

The translation layer 12 is functionally completely transparent to the end user, executing as a daemon (i.e., a process that executes in the background in order to be available at all times) on a "UNIX" machine 11 running one or more "X WINDOWS" applications 18, 20 and 22, and performs six vital functions. It provides an X11R4 (xlib) compliant network interface to connecting the "X WINDOWS" applications 18, 20 and 22; it transforms all X requests from connected "X WINDOWS" applications into corresponding "MICROSOFT WINDOWS" front end calls (CPQ requests); it converts information sent from the "WINDOWS" front end 14 (CPQ replies) into corresponding X replies; it converts events emitted from the "WINDOWS" front end 14 (CPQ events) into corresponding X events; it converts error codes generated by the "WINDOWS" front end 14 (CPQ errors) into corresponding X errors; and, it provides a CPQ compliant network interface. The basic structure of the translation layer 12 is shown in FIG. 2.

From the viewpoint of the "X WINDOWS" applications 18, 20 and 22, the translation layer 12 (or more specifically the X protocol interface 24) appears as an X server. At this layer all network packets and timing adhere to the X11R4 protocol. By emulating the X server functionality at this layer, the "X WINDOWS" applications 18, 20 and 22 are not required to be re-compiled or re-linked in order to run with the CPQ server 10. From the standpoint of the user, therefore, this means that the CPQ server 10 will be binary-compatible with the "X WINDOWS" applications 18, 20 and 22 and any other "X WINDOWS" applications which are written to the X11R4 specification.

The bull of the work for the translation layer 12 is done in its mapping routines 26. Such mapping routines 26 must faithfully translate the requests from the "X WINDOWS" applications 18, 20 and 22 into the appropriate CPQ request. Likewise, replies, events and errors from the Windows front end 14 must also be successfully convened by the translation layer 12 before delivery to the "X WINDOWS" applications 18, 20 and 22. As stated herein before, an objective of the present invention is to minimize the resource requirements of the PC. Therefore, if a given conversion can be done equally well in either the translation layer 12 or the "WINDOWS" front end 14, it is always performed in the translation layer 12. If, on the other hand, system performance would be greatly impacted by performing the conversion in the translation layer 12, then it is migrated to the "WINDOWS" front end 14. Likewise, information sent from the "WINDOWS" front end 14 may not always contain everything that is needed by the "X WINDOWS" applications 18, 20 and 22, or such information may be in a different format. Rather than suffer the performance hit on the PC, it is the responsibility of the translation layer 12 according to the present invention to add and/or change the format of the data to insure X11R4 compliance. Details of such mapping routines 26 may be found herein below.

Like the X protocol interface 24, the CPQ protocol interface 16 serves as a network communication endpoint. It is responsible for establishing and maintaining multiple simultaneous connections to multiple "WINDOWS" front ends 14 (only one of which is shown in FIG. 1 for the purposes of simplicity). All information exchanged between the translation layer 12 and the "WINDOWS" front end 14 occurs at this layer and complies with the CPQ protocol specification which will be explained in greater detail herein below.

The "WINDOWS" front end 14 represents the other fundamental piece of the present invention. It is the most visible component of the CPQ server 10 and is designed to use a minimum of system resources from the PC 13. According to a presently preferred embodiment of this invention, it is a network-aware "MICROSOFT WINDOWS" application that is responsible for parsing and dispatching CPQ requests, signaling events and errors back to the translation layer 12, and gathering information for replies. The "WINDOWS" front end 14 is also the mechanism by which the user interacts with the CPQ server 10 to change various options; for example, setting system resource thresholds, establishing access rights. The "WINDOWS" front end 14 maintains a separate network connection for each of the "X WINDOWS" applications 18, 20 and 22 that is running on the PC and can support multiple simultaneous network connections. Through the use of the "MICROSOFT WINDOWS" clipboard service, it supports interprogram communication between the "X WINDOWS" applications 18, 20 and 22 and native "MICROSOFT WINDOWS" applications. The "WINDOWS" front end 14 is comprised of four major components: a network interface 28, a parser/dispatcher 30, an event reporter 32, and an error reporter 34. The responsibilities of each of the foregoing components 28, 30, 32 and 34 shall be described in greater detail herein below.

Unlike true preemptive multitasking environments (e.g., "UNIX" and OS/2) that use their respective operating systems to distribute the system load, "MICROSOFT WINDOWS" is a message-driven, cooperative multitasking environment. Programs written under "MICROSOFT WINDOWS" do not execute until a message is place in their queue. Once queued, the "MICROSOFT WINDOWS" application must process the message as quickly as possible so that the CPU can be relinquished to another "MICROSOFT WINDOWS" application. Network communication (or, for that matter, any time-consuming process) under "MICROSOFT WINDOWS" is very difficult to accomplish due to its cooperative multitasking nature. Performing a time-consuming process, such as waiting in a loop for network data to arrive, in a single uninterrupted thread of execution is completely unsatisfactory because "MICROSOFT WINDOWS" will never run any other task and will appear frozen to the user during that time. Therefore, careful consideration must be given to the design of the network interface 28. In accordance with a preferred embodiment of the present invention, the solution is to poll for network activity and break the network packet into a sequence of tasks controlled by a finite state machine, which is shown in FIG. 3.

Figure 3:
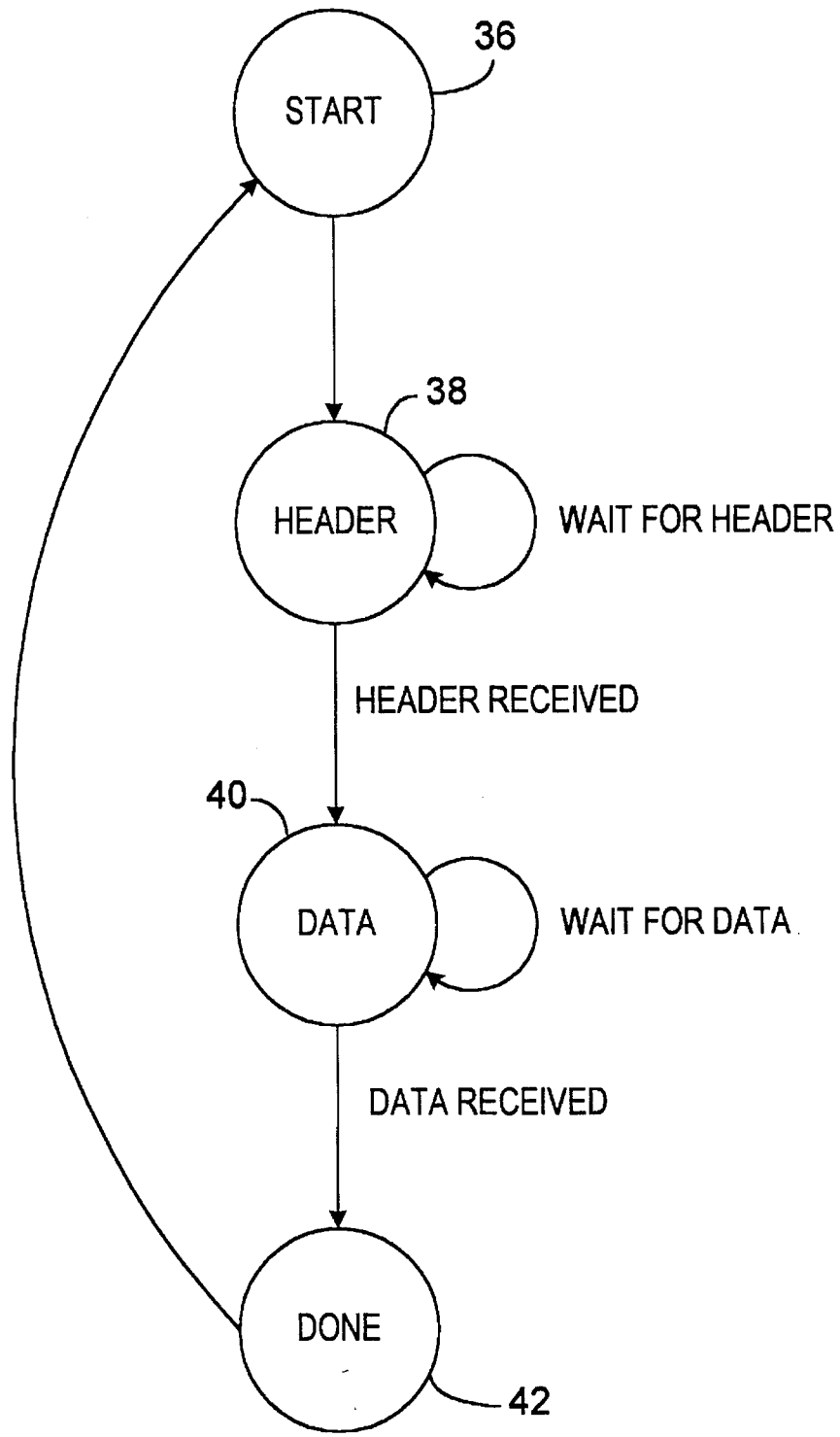
FIG. 3 is the state machine used by the front end processor shown in FIG. 1.

Referring now to FIG. 3, a START state 36 begins by initializing a network connection data structure. Once the connection structure has been successfully initialized, a HEADER state 38 is entered. In this state 38, the network queue is examined for the presence of a CPQ request header as follows:

```
typedef struct_CPQREQUESTHEADER{
    USHORT usMajorOpCode;
    USHORT usMinorOpCode;
    USHORT usSeqNumber;
    USHORT usPktLength;
}CPQREQUESTHEADER,
FAR *LPCPQREQUESTHEADER;
```

If the header is not present in the queue, control is passed back to "MICROSOFT WINDOWS" to allow the processing of any system messages. If, however, a header is found in the queue, it is read in, the number of data bytes associated with the header are determined from the packet length field, and the DATA state 40 is entered. The queue is again examined, this time for the data portion of the packet. If no data is present, then control is released back to "MICROSOFT WINDOWS". If data is present, however, it is read in. If the entire data portion of the packet is read, then the DONE state 42 is entered; if not, then control is passed back to "MICROSOFT WINDOWS". After all of the data has been read, the DONE state 42 is entered. In the DONE state 42, the status field in the connection structure is updated to reflect the successful arrival of a network packet, the parser/dispatcher layer 30 is invoked and the START state 36 is re-entered.

The parser/dispatcher layer 30 is called by the state machine (FIG. 3) whenever a fully-formed network packet has arrived. A parser portion of the parser/dispatcher layer 30 breaks down the packet and verifies that the request is valid. The parser portion then passes control to a dispatcher portion where the appropriate routine is called. Upon completion of the call, the dispatcher portion returns control back to "MICROSOFT WINDOWS".

All windows created by the "WINDOWS" front end 14 on the behalf of "X WINDOWS" applications 18, 20 and 22 are instances of a single window class named CPQCLIENTCLASS. This class structure contains information for the network connection, the event mask and the device context. It also contains a pointer to the function that handles all messages sent to the window from the Microsoft window manager.

During the creation of a window, a 32-bit mask (i.e., event mask) is defined that indicates to the "WINDOWS" front end 14 what events the client is interested in receiving. This mask is used to qualify which messages sent from the Microsoft window manager (FIGS. 8 and 9) to the window are transmitted to the translation layer 12. Messages that have a corresponding entry in the event mask are sent to the translation layer 12 as CPQ events. Those messages that do not correspond are simply handled locally by default window routines. Event mask definitions and CPQ events that are available to the translation layer 12 are shown in Tables I and II below:

TABLE I

CPQ Event Mask Definitions

| | |
|---|---|
| #define EVENT_NO_MASK | 0L |
| #define EVENT_KEYDOWN_MASK | (1L << 0) |
| #define EVENT_KEYUP_MASK | (1L << 1) |
| #define EVENT_BUTTONDOWN_MASK | (1L << 2) |
| #define EVENT_BUTTONUP_MASK | (1L << 3) |
| #define EVENT_ENTERWINDOW_MASK | (1L << 4) |
| #define EVENT_LEAVEWINDOW_MASK | (1L << 5) |
| #define EVENT_MOUSEMOVE_MASK | (1L << 6) |
| #define EVENT_MOUSRMOVE_HINT_MASK | (1L << 7) |
| #define EVENT_LBUTTONMOVE_MASK | (1L << 8) |
| #define EVENT_MBUTTONMOVE_MASK | (1L << 9) |
| #define EVENT_RBUTTONMOVE_MASK | (1L << 10) |
| #define EVENT_BUTTONMOVE_MASK | (1L << 13) |
| #define EVENT_KEYSTATE_MASK | (1L << 14) |
| #define EVENT_PAINT_MASK | (1L << 15) |
| #define EVENT_VISIBILITY_CHANGE_MASK | (1L << 16) |
| #define EVENT_STRUCTURE_NOTIFY_MASK | (1L << 17) |
| #define EVENT_RESIZE_REDIRECT_MASK | (1L << 18) |
| #define EVENT_SUBSTRUCTURE_NOTIFY_MASK | (1L << 19) |
| #define EVENT_SUBSTRUCTURE_REDIRECT_MASK | (1L << 20) |
| #define EVENT_FOCUS_CHANGE_MASK | (1L << 21) |
| #define EVENT_PROPERTY_CHANGE_MASK | (1L << 22) |
| #define EVENT_COLORMAP_CHANGE_MASK | (1L << 23) |
| #define EVENT_OWNER_GRAB_BUTTON_MASK | (1L << 24) |

TABLE II

CPQ Events

| Event | Event ID | Event Data |
|---|---|---|
| EvtKeyDown | EVENT_KEYDOWN | KEYEVENTDATA |
| EvtKeyUp | EVENT_KEYUP | KEYEVENTDATA |
| EvtButtonDown | EVENT_BUTTONDOWN | BUTTONEVENTDATA |
| EvtButtonUp | EVENT_BUTTONUP | BUTTONEVENTDATA |
| EvtFocusIn | EVENT_SETFOCUS | XWINDOWID |
| EvtFocusOut | EVENT_KILLFOCUS | XWINDOWID |
| EvtPaint | EVENT_PAINT | PAINTEVENTDATA |
| EvtSizeWindow | EVENT_SIZEWINDOW | SIZEWINDOWEVENTDATA |
| EvtShowWindow | EVENT_SHOWWINDOW | SHOWWINDOWEVENTDATA |
| EvtFHideWindow | EVENT_HIDEWINDOW | HIDEWINDOWEVENTDATA |
| EvtDestroyWindow | EVENT_DESTROYWINDOW | DESTROYWINDOWEVENTDATA |
| EvtGraphicsExposure | EVENT_GRAPHICSEXPOSURE | GRAPHICSEXPOSUREEVENTDATA |
| EvtNoExposure | EVENT_NOEXPOSURE | NOEXPOSUREEVENTDATA |

Error reporting by the "WINDOWS" front end 14 is performed when inappropriate information, typically an invalid window handle, is supplied in the CPQ request. The error reporting code determines which request from the translation layer 12 caused the error and places the major opcode of the request, along with the error ID in an error packet and submits the packet to the translation layer 12. Error codes according to the present invention follow in Table III:

TABLE III

CPQ Error Codes

| ERROR_INVALIDREQUEST | 0 |
| ERROR_UNABLETOOPENWINDOW | 1 |
| ERROR_INVALIDWINDOWHANDLE | 2 |
| ERROR_INVALIDGHANDLE | 3 |
| ERROR_INVALIDBITMAPHANDLE | 4 |
| ERROR_INVALIDFONTHANDLE | 5 | stream. The "big-endian" format, on the other hand occurs where, in a multi-byte data word, the MSB appears first and the LSB appears last in a sequential byte stream. If a big-endian "X WINDOWS" application connects to the translation layer 12, then it is the responsibility of the translation layer 12 to convert the requests to the little-endian format before submitting them to the "WINDOWS" front end 14. Likewise, replies, events and errors must be converted to the big-endian format before propagating them to the "X WINDOWS" applications 18, 20 and 22. Since there is no need to determine byte ordering when connecting to the "WINDOWS" front end 14, a special handshake is not required at connect time as is the case with "X WINDOWS". Typically, after establishing a connection to the "WINDOWS" front end 14, the translation layer 12 will issue a ReqFrontEndInfo command. The "WINDOWS" front end 14 will respond with the PC's screen resolution, screen dimensions in millimeters, the number of color planes available. The WFEINFOREPLYDATA structure follows:

```
// Front end information
//
typedef struct_WFEINFOREPLYDATA {
    USHORT  usProtocolMajor;   // Current version 1.0 has this field as 01
    USHORT  usProtocolMinor;   // and this field as 00
    USHORT  usHorzRes;         // Horizontal size of display in pixels
    USHORT  usVertRes;         // Vertical size of display in pixels
    USHORT  usHorzSize;        // Horizontal size of display in millimeters
    USHORT  usVertSize;        // Vertical size of display in millimeters
    USHORT  usBitsPerpixel;    // Bits per pixel for color
    USHORT  usColorPlanes;     // Number of color planes
    USHORT  usNumColors;       // Number of pure colors
    USHORT  usPaletteSupport;  // Zero if no palette manager
    USHORT  usPaletteSize;     // Size of the system palette
    USHORT  usNumReserved;     // Number of colors reserved for "WINDOWS" in the system palette
    USHORT  usColorRes;        // Bits per color (RGB) DACs in lookup table
    USHORT  usPad;             // Pad
    DWORD   dwWinFlags;        // Window flags
    }WFEINFOREPLYDATA;
```

This section describes the custom protocol used to communicate between the translation layer 12 and the "WINDOWS" front end 14. The CPQ network protocol is modeled after the X network protocol. However, there are some notable exceptions. The byte ordering for the CPQ network protocol is always in the "little-endian" format. As is well known to those of ordinary skill in the art, the "little-endian" format refers to those situations where, in a multi-byte data word, the least significant byte (LSB) appears first and the most significant byte (MSB) appears last in a sequential byte The CPQ protocol according to the present invention is designed to be used with any reliable byte oriented protocol such as TCP or SPX.

Figure 4:
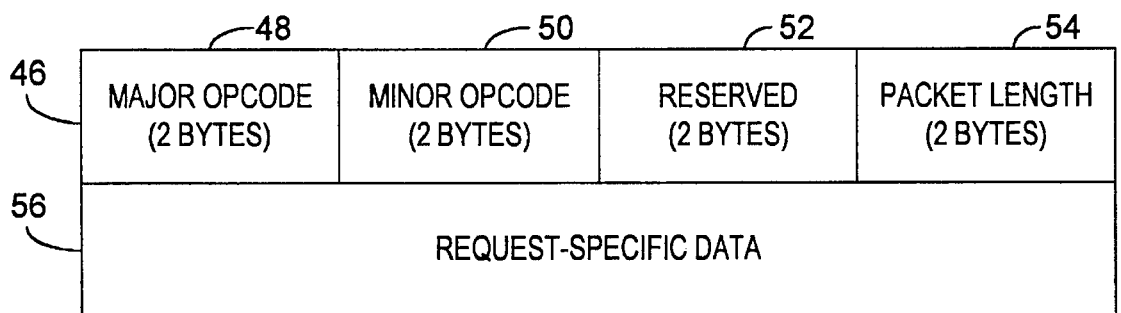
FIG. 4 illustrates the structure of a CPQ request packet used by the CPQ network protocol shown in FIG. 2.

As shown in FIG. 4, CPQ requests 44 under the custom protocol consist of a header 46 followed by request-specific data 56. The header 46 is made up of eight bytes containing a major opcode field 48, a minor opcode field 50, and a packet length 54. An additional two bytes 52 may be reserved for other purposes. Any value from 0 to 65535 can be used in the major and minor opcode fields 48, 50. A list of CPQ requests 44 according to a presently preferred embodiment of this invention follows in Table IV:

a sequence number field 66, and a packet length field 68. The identification field 62 is set to zero to indicate that the CPQ

TABLE IV

CPQ Requests

| Request | Major OpCode | Minor OpCode | Request Data | Reply |
|---|---|---|---|---|
| ReqFrontEndInfo | 0 | 0 | None | yes |
| ReqCreateWindow | 1 | 0 | CREATEWINDOWREQUESTDATA | yes |
| ReqChangeWindowAttributes | 2 | 0 | CHANGEWINDOWAATTRIBUTESREQUESTDATA | no |
| ReqGetWindowAttributes | 3 | 0 | HWND 0 | yes |
| ReqDestroyWindow | 4 | 0 | HWND 0 | no |
| ReqDestroySubWindows | 5 | 0 | HWND | no |
| ReqShowWindow | 6 | 0 | HWND | no |
| ReqShowSubWindows | 7 | 0 | HWND | no |
| ReqHideWindow | 8 | 0 | HWND | no |
| ReqHideSubWindows | 9 | 0 | HWND | no |
| ReqChangeWindow | 10 | 0 | CONFIGUREWINDOWREQUESTDATA 0 | no |
| ReqGetGeometry | 11 | 0 | HANDLE | yes |
| ReqGetMousePosition | 12 | 0 | HWND | yes |
| ReqOpenFont | 13 | 0 | CREATEFONTDATA | yes |
| ReqCloseFont | 14 | 0 | HFONT | yes |
| ReqQueryFont | 15 | 0 | CHAR | yes |
| ReqGetWindowText | 16 | 0 | SETWINDOWTEXTREQUESTDATA | no |
| ReqCreateGC | 17 | 0 | CREATEGCREQUESTDATA | yes |
| ReqChanlReGC | 18 | 0 | CHANGEGCREQUESTDATA | no |
| ReqDestroyGC | 19 | 0 | HGC | no |
| ReqGetNearestColor | 20 | 0 | QUERYCOLORSREEQUESTDATA | yes |
| ReqClearArea | 21 | 0 | CLEARAREAREQUESTDATA | no |
| ReqCopyArea | 22 | 0 | COPYAREAREQUESTDATA | no |
| ReqPolyPoint | 23 | 0 | POLYPOINTREQUESTDATA | no |
| ReqPolyLine | 24 | 0 | POLYLINEREQUESTDATA | no |
| ReqPolySegment | 25 | 0 | POLYSEGMENTREQUESTDATA | no |
| ReqPolyRectangle | 26 | 0 | POLYRECTANGLEREQUESTDATA | no |
| ReqPolyArc | 27 | 0 | POLYARCREQUESTDATA | no |
| ReqPolygon | 28 | 0 | POLYGONREQUESTDATA | no |
| ReqPolyFillRectangle | 29 | 0 | POLYFILLRECTANGLEREQUESTDATA | no |
| ReqPolyFillArc | 30 | 0 | POLYFILLARCREQUESTDATA | no |
| ReqPolyText8 | 31 | 0 | POLYTEXT8REQUESTDATA | no |
| ReqImageText8 | 32 | 0 | IMAGE8REQUESTDATA | no |
| ReqCreateBitmap | 33 | 0 | CREATEBITMAPREQUESTDATA | Yes |
| ReqDestroyBitmap | 34 | 0 | HBITMAP | no |
| ReqQueryColors | 35 | 0 | QUERYCOLORSREQUESTDATA | yes |
| ReqTextOut | 36 | 0 | TEXTOUTDATA | no |
| ReqGetWindowText | 37 | 0 | HWND | yes |

The packet length 54 defines the total length of the packet including the header. The length field must equal the minimum length required to contain the request. The minimum packet length for a request is eight bytes and the maximum length is 1024 bytes. This is also true for the other packet types. Like the X protocol, every request on a given connection is assigned a number that is used in replies, events and errors.

Figure 5:
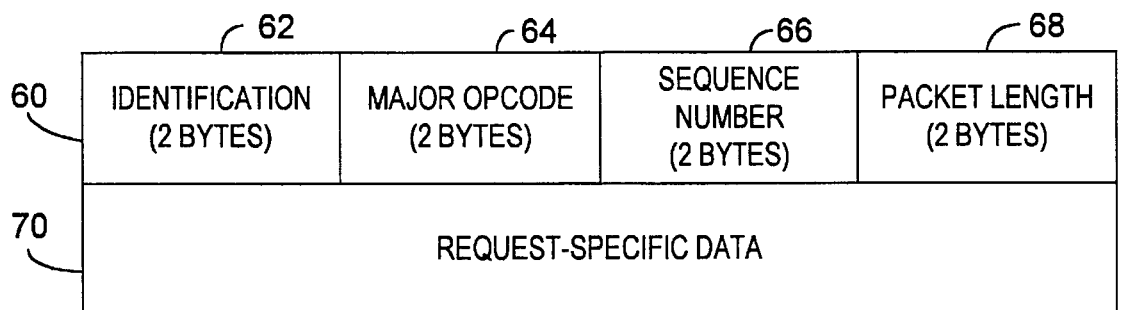
FIG. 5 illustrates the structure of a CPQ reply packet used by the CPQ network protocol shown in FIG. 2.

As shown in FIG. 5, every CPQ reply packet 58 consists of a header 60 followed by specific data 70 associated with the reply. The reply header 60 is eight bytes long and contains an identification field 62, a major opcode field 64, reply packet 58 is in response to a CPQ request 44; the major opcode field 64 is set to the major opcode of the initiating CPQ request 44; the sequence number field 66 contains a number assigned by the "WINDOWS" front end 14; and the packet length field 68 is the length of the packet including the header 60. A list of CPQ replies follows in Table V:

TABLE V

CPQ Replies

| Reply | Major Opcode | Reply Data |
|---|---|---|
| RpyWFEInfo | 0 | WFEINFOREPLYDATA |
| RpyCreateWindow | 1 | HWND |
| RpyGetWindowAttributes | 3 | GETWINDOWATTRIBUTESREPLYDATA |
| RpyGetGeometry | 11 | GETGEOMETRYREPLYDATA |
| RpyGetMousePosition | 12 | GETMOUSEPOSTIONREPLYDATA |
| RpyOpenFont | 13 | HFONT |
| RpyCreateGC | 17 | HGC |

TABLE V-continued

CPQ Replies

| Reply | Major Opcode | Reply Data |
|---|---|---|
| RpyGetNearestColor | 20 | RGBQUAD |
| RpyCreateBitmap | 33 | HBITMAP |
| RpyQueryColors | 35 | QUERYCOLORSREPLYDATA |
| RpyGetWindowText | 37 | WINDOWTEXTDATA |

Figure 6:
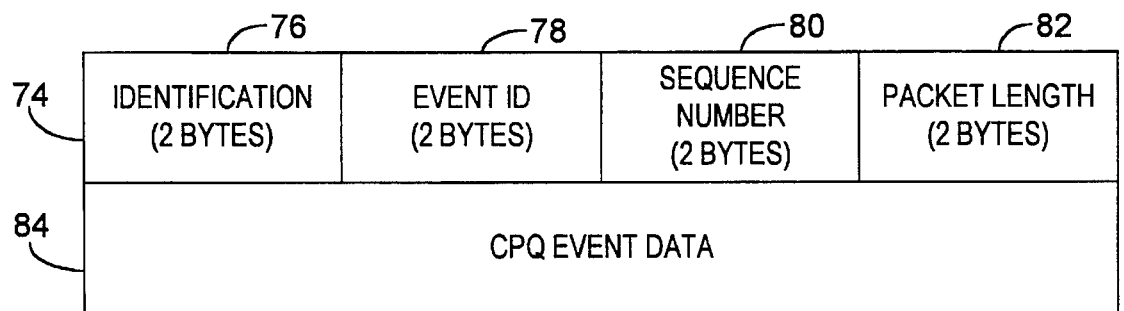
FIG. 6 illustrates the structure of a CPQ event packet used by the CPQ network protocol shown in FIG. 2.

As shown in FIG. 6, CPQ event packets 72 also consist of a header 74 and event data 84. The event header 74 is eight bytes long and contains an identification field 76, an event 1D field 78, a sequence number field 80 and a packet length 82. The identification field 76 is set to one to indicate an event packet, and defines the type of event that occurred. A list of CPQ events according to the present invention follows in Table VI:

TABLE VI

CPQ Events

| Event | Event ID | Event Data |
|---|---|---|
| EvtKeyDown | EVENT_KEYDOWN | KEYEVENTDATA |
| EvtKeyUp | EVENT_KEYUP | KEYEVENTDATA |
| EvtButtonDown | EVENT_BUTTONDOWN | BUTTONEVENTDATA |
| EvtButtonUp | EVENT_BUTTONUP | BUTTONEVENTDATA |
| EvtSetFocus | EVENT_SETFOCUS | XWINDOWID |
| EvtKillFocus | EVENT_KILLFOCUS | XWINDOWID |
| EvtPaint | EVENT_PAINT | PAINTEVENTDATA |
| EvtSizeWindow | EVENT_SIZEWINDOW | SIZEWINDOWEVENTDATA |
| EvtShowWindow | EVENT_SHOWWINDOW | SHOWWINDOWEVENTDATA |
| EvtHideWindow | EVENT_HIDEWINDOW | HIDEWINDOWEVENTDATA |
| EvtDestroyWindow | EVENT_DESTROYWINDOW | DESTROYWINDOWEVENTDATA |
| EvtGraphicsExposure | EVENT_GRAPHICSEXPOSURE | GRAPHICSEXPOSUREEVENTDATA |
| EvtNoExposure | EVENT_NOEXPOSURE | NOEXPOSUREEVENTDATA |

Figure 7:
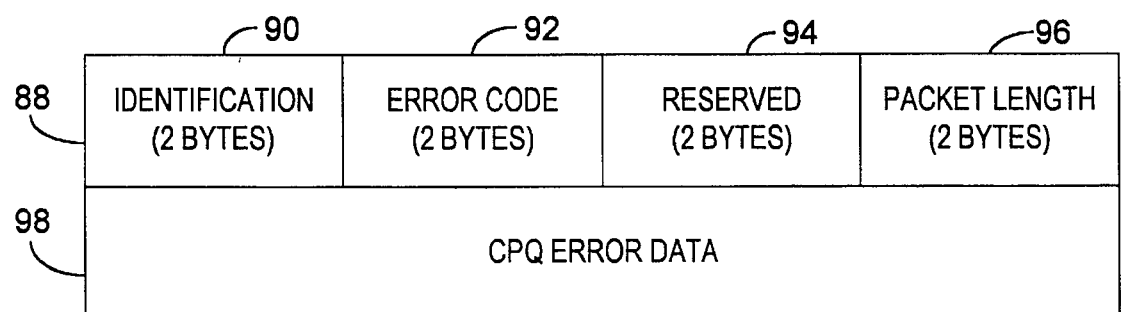
FIG. 7 illustrates the structure of a CPQ error packet used by the CPQ network protocol shown in FIG. 2.

As shown in FIG. 7, CPQ error packets 86 likewise contain a header 88 (comprising an identification field 90, an error code field 92, a Sequence ice number field 94 and a packet length 96) and error data 98. The error header 88 is made up of eight bytes; the identification field 90 is set to two to signify an error packet 86; and the error code field 92 indicates the reason for the packet 86. A list of CPQ error codes according to the present invention follows in Table VII

TABLE VII

CPQ Error Codes

| | |
|---|---|
| ERROR_INVALIDREQUEST | 0 |
| ERROR_INVALIDWINDOWHANDLE | 1 |
| ERROR_INVALIDFONTHANDLE | 2 |
| ERROR_NOTENOUGHMEMORY | 3 |
| ERROR_INVALIDECURSORHANDLE | 4 |
| ERROR_INVALIDBITMAPHANDLE | 5 |
| ERROR_INVALIDGCHANDLE | 6 |
| ERROR_INVALIDPARAMETER | 7 |

The error data, CPQERRORDATA, is defined as:

```
typedef struct_CPQERRORDATA{
    USHORT usMajorOpCode;
    USHORT usMinorOpCode;
}CPQERRORDATA;
``` where:
usMajorOpCode—is a 16 bit value representing the major opcode of the errant request
usMinorOpCode—is a 16 bit value representing the minor opcode of errant request The most fundamental object of the CPQ server 10, the window, will now be described with reference to FIGS. 8–10. The types of windows used by the "WINDOWS" front end 14 are discussed, followed by a discussion of window management.

As discussed herein above, all window entities created by the "WINDOWS" front end 14 on the behalf of the "X WINDOWS" applications 18, 20 and 22 are instances of a single window class named CPQCLIENTCLASS. These entities are true Microsoft windows and fall into one of the three fundamental Microsoft window types: overlapped, popup and child. Similarly, "X WINDOWS" supports three fundamental windows types: top-level, sibling, and child. With "X WINDOWS", a top-level window is identified as one that has as its parent the root window. An "X WINDOWS" applications have at least two windows: a top-level window and a child of the top-level window. The top-level window is placed there by "X WINDOWS" for use by the window manager (FIGS. 8 and 9) to place window decorations (e.g., a border or a title bar on the window). The window manager is responsible for manipulating the top-level window. No drawing takes place in the top-level window by the application. Instead, sibling and child windows are used. The translation layer 12 maps a window creation request from an "X WINDOWS" application to ReqCreateWindow with the CREATEWINDOWREQUESTDATA structure found immediately herein below:

```
typedef struct_CREATEWINDOWREQUESTDATA{
    DWORD    dwXWindowID;
```

13
-continued

```
    HWND       hwndParent;
    SHORT      X;
    SHORT      Y;
    USHORT     usWidth;
               USHORT      usHeight;
    USHORT     usClass;
               DWORD       dwAttribMask;
               HBITMAP     hbmpBackground;
    USHORT     usPad1;
               COLORREF    crBackgroundPixel;
               HBITMAP     hbmpBorder;
    USHORT     usPad2;
               COLORREF    crBorderPixel;
               CHAR        cbBitGravity;
               CHAR        cbWinGravity;
               BOOL        bBackingStore;
               ULONG       ulBackingPlanes;
               COLORREF    crBackingPixel;
               BOOL        bOverride;
    BOOL       bSaveUnder;
               DWORD       dwEventMask;
               DWORD       dwDontPropagateEventMask;
               HANDLE      hColormap;
               HANDLE      hCurcursor
    }CREATEWINDOWREQUESTDATA,
    FAR *LPCREATEWINDOWREQUESTDATA;
```

Since "X WINDOWS" identifies windows through unique 32-bit numbers and "MICROSOFT WINDOWS" uses 16-bit values (window handles), a mapping routine is used in the translation layer 12 to convert "X WINDOWS" identifiers to "MICROSOFT WINDOWS" handles. The type of window created by the "WINDOWS" front end 14 (e.g., overlapped, popup or child) is specified in the style member of the CREATEWINDOWREQUESTDATA data type. The following algorithm is used in the translation layer 12 for window creation. If the parent ID of the "X WINDOWS" request is the root window, then a Microsoft overlapped window is created. If the "X WINDOWS" request is for a sibling window, then a Microsoft popup window is created. If the "X WINDOWS" request is for a child window, then a Microsoft child window is created.

Figure 8:
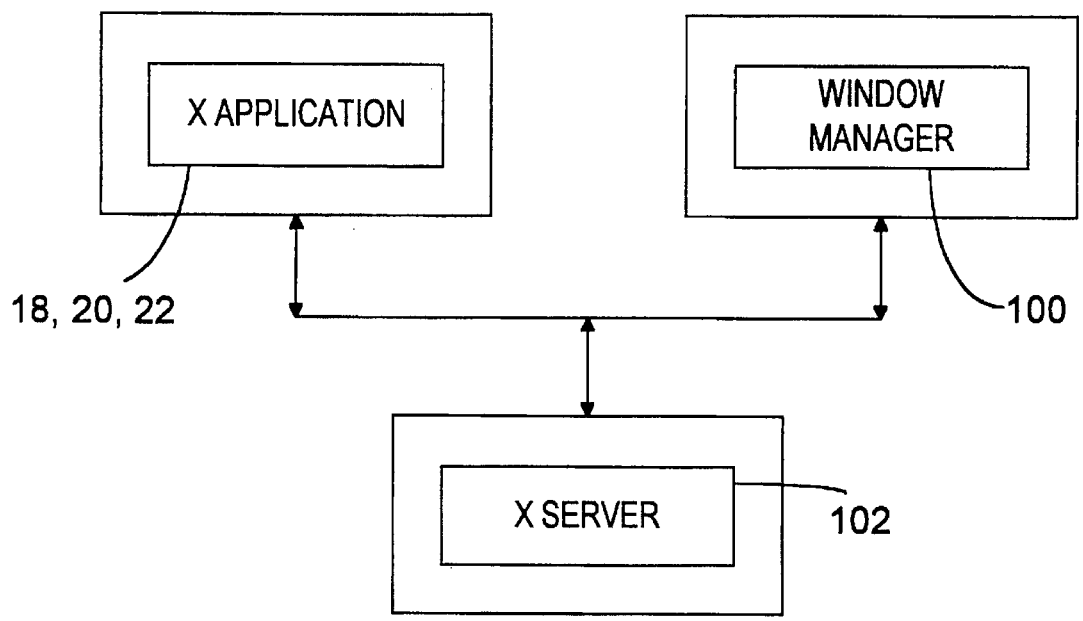
FIG. 8 demonstrates how a prior art windows manager is used in a pure "X WINDOWS" environment.

In a pure "X WINDOWS" environment, the manipulation of windows on the screen and much of the user interface is provided by a window manager client. The window manager client (which can run either locally or remotely) is an "X WINDOWS" application .that controls the look and feel of the "X WINDOWS" application, as shown in FIG. 8.

The window manager 100 intercedes for the "X WINDOWS" applications 18, 20 and 22 and provides information to the X server 102 about the window position and focus. It does this by intercepting events originally destined to the "X WINDOWS" application 18, 20 and 22 from the X server and routes the events to itself. The window manager 100 decides what action is to take place and sends the appropriate request(s) to the X server 102 and notification event(s) to the "X WINDOWS" application. If the window manager 100 is run remotely, a performance hit is taken because of the additional traffic between the window manager 100 and the "X WINDOWS" application 18, 20 and 22 and between the window manager 100 and the X server 102.

Figure 9:
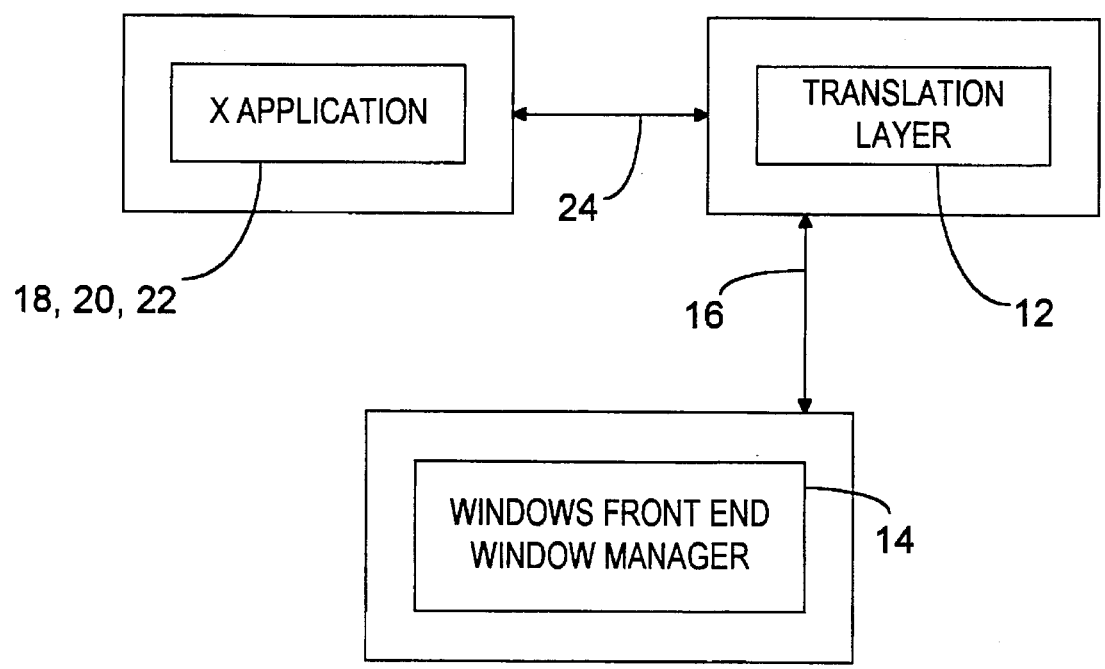
FIG. 9 illustrates windows management using the CPQ server according to the present invention.

Because every window created by the "WINDOWS" front end 14 is a true Microsoft window, all windows (both windows representing "X WINDOWS" applications and normal "MICROSOFT WINDOWS" applications) are under the control of the Microsoft window manager 100. Therefore, a consistent and uniform interface is presented to the user, whether he is running a local "MICROSOFT WINDOWS" application or he is running a remote "X WINDOWS" application. By allowing the "MICROSOFT WINDOWS" manager 100 to control the "X WINDOWS" applications 18, 20 and 22, all window management is local, which reduces the code required for the "WINDOWS" front end 14 and reduces network traffic. FIG. 9 illustrates window management under the CPQ server 10.

Figure 10:
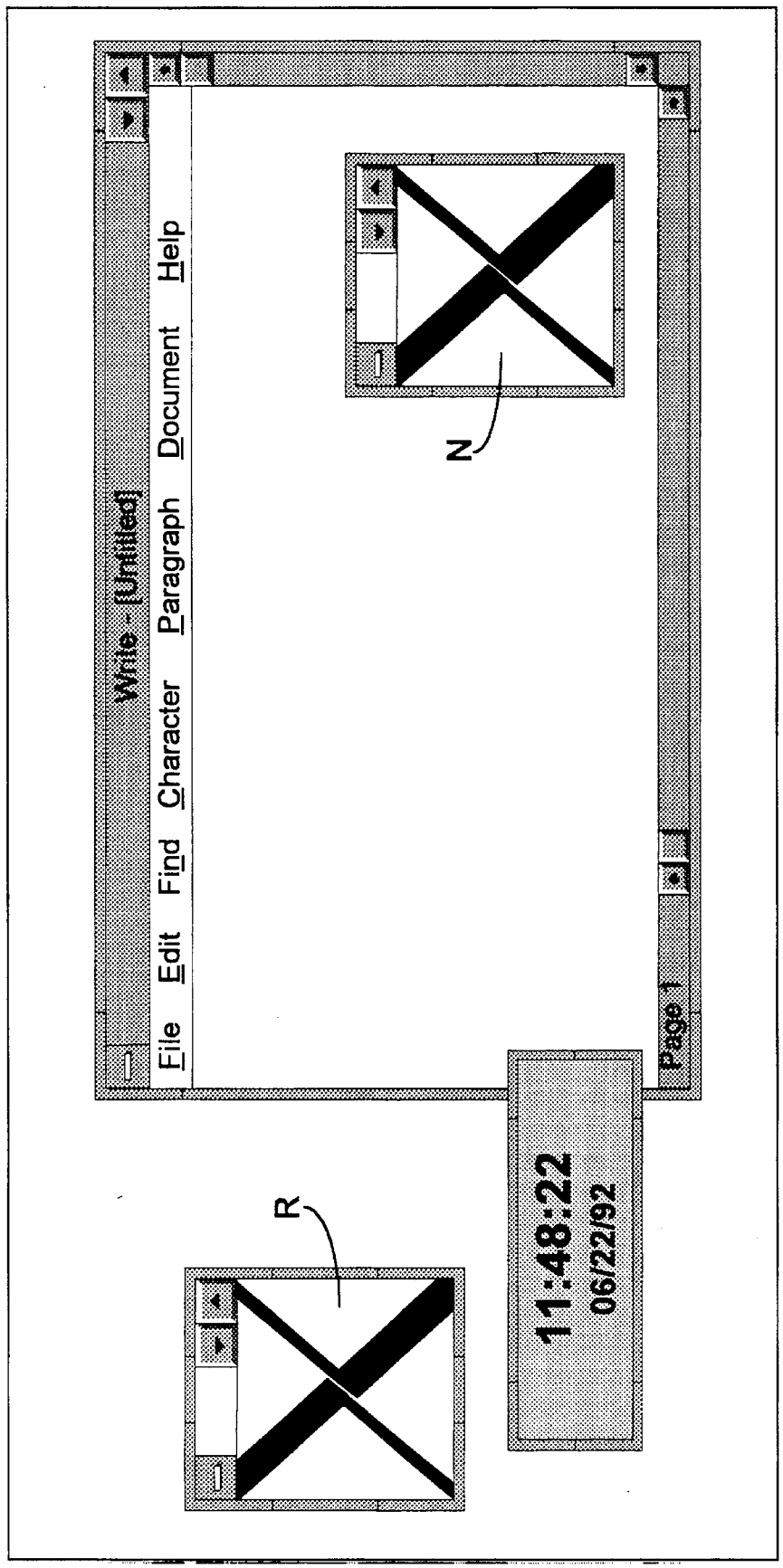
FIG. 10 shows how X applications look to the user running under the CPQ server according to the present invention.

Referring now to FIG. 10, it can be seen how the "X WINDOWS" applications 18, 20 and 22 running under the CPQ server 10 look to the user. It should be noticed that no distinction is made between the "X WINDOWS" applications 18, 20 and 22 running remotely R and the native "WINDOWS" applications N. All window manipulation actions (e.g., maximizing, minimizing and resizing) are identical.

The policies and procedures used by the mapping routines found in the translation layer 12 will now be described and broken down into three major topics: requests, events and errors. Each topic is further broken down into categories where the overall mapping strategies are discussed along with the detailed mapping procedures.

An "X WINDOWS" application communicates with the translation layer 12 via the X protocol 24. The translation layer 12 calls upon the mapping routines 26 to convert a specific "X WINDOWS" request into the appropriate CPQ request. The translation layer 12 is responsible for providing and maintaining the mechanism for convening between X IDs used in "X WINDOWS" and handles which are used in "MICROSOFT WINDOWS".

The following will identify and categorize all of the X requests available for X11R4 and discuss the mapping policies used by the translation layer 12 to convert the X requests. Possible compatibility problems are also identified.

An identification of the X requests that fall into the category of Window Functions and description of the mapping policies used by the translation layer 12 for each request in this category will now be covered. There are a number of window function requests that are handled by the translation layer 12; principally: CreateWindow, DestroyWindow, DestroySubWindows, MapWindow, MapSubWindow, UnmapWindow, UnmapSubWindow, ConfigureWindow, and ChangeWindowAttributes.

To create a window, an X client submits a CreateWindow request to the translation layer 12. The members of CreateWindow are copied (or translated in the case of IDs) to corresponding members of ReqCreateWindow. The only members not copied are: border_width, border pixel, depth and visual. Border members are fixed by "WINDOWS" and the depth and visual members are fixed by the limitation of the display hardware. See, e.g., the CREATEWINDOWREQUESTDATA structure described herein above. An X client submits a DestroyWindow request to the translation layer 12 to destroy a window. The translation layer 12 locates the window handle and issues a ReqDestroyWindow to the "WINDOWS" front end 14. To destroy all subwindows of a given window, an X client submits a DestroySubwindows request to the translation layer 12. The translation layer 12 maps the window handle and issues a ReqDestroySubWindows to the "WINDOWS" front end 14. To make a given window visible to the user, an X client issues a MapWindow request to the translation layer 12. The translation layer 12 locates the window handle and transmits a ReqShowWindow to the "WINDOWS" front end 14. An X client issues a MapSubwindow request to the translation layer 12 to make all subwindows of a given window visible. The translation layer 12 converts the supplied window ID to a window handle and issues a ReqShowSubWindow to the "WINDOWS" front end 14. To hide a given window, an X client transmits an UnmapWindow request to the translation layer 12. The translation layer 12 locates the window handle and submits a ReqHideWindow to the "WINDOWS" front end 14. To hide all subwindows of a given window, an X client issues an UnmapSubwindows request to the translation layer 12. The translation layer 12 locates the window handle from the supplied window ID and transmits a ReqHideSubWindows to the "WINDOWS" front end 14. When the translation layer 12 receives a ConfigureWindow request from an X client it is translated to a ReqConfigureWindow request.

When the translation layer 12 receives a CirculateWindow request from an X client, it is translated to a ReqCirculateWindow request. When the translation layer 12 receives a ChangeWindowAttributes request from an X client it is translated to a ReqChangeWindowAttributes request. When the translation layer 12 receives a TranslateCoordinates request from an X client it is translated to a ReqTranslateCoordinates request. Illustrative structures are shown immediately herein below.

```
typedef struct_CONFIGUREWINDOWREQUESTDATA{
    HWND        hWnd;
    USHORT      usMask;
    SHORT       X;
    SHORT       Y;
    USHORT      usWidth;
    USHORT      usHeight;
    HWND        hWndSibling;
    SHORT       sStackingOrder;
    }CONFIGUREWINDOWREQUESTDATA, FAR *LPCONFIGUREWINDOWREQUESTDATA;
//Circulate window
//
typedef struct_CIRCULATEWINDOWDATA{
    HWND        hWnd;
    SHORT       sDirection
    }CIRCULATEWINDOWDATA;
    typedef struct_CHANGEWINDOWATTRIBUTESREQUESTDATA{
        HWND        hWnd;
        USHORT      usPad1;
        DWORD       dwAttribMask;
        HBITMAP     hbmpBackground;
        USHORT      usPad2;
        COLORREF    crBackgroundPixel;
        HBITMAP     hbmpBorder;
        USHORT      usPad3;
        COLORREF    crBorderPixel;
        CHAR        cbBitGravity;
        CHAR        cbWinGravity;
        BOOL        bBackingStore;
        ULONG       ulBackingPlanes;
        COLORREF    crBackingPixel;
        BOOL        bOverride;
    BOOL        bSaveUnder;
        DWORD       dwEventMask;
        DWORD       dwDontPropagateEventMask;
        HANDLE      hColormap;
        HANDLE      hcurCursor;
        }CHANGEWINDOWATTRIBUTESREQUESTDATA, FAR
*LPCHANGEWINDOWATTRIBUTESREQUESTDATA;
//
// Translate coordinates
//
typedef struct_TRANSLATECOORDDATA{
    HWND        hWndSrc;
    HWND        hWndDest;
    SHORT       X;
    SHORT       Y;
    }TRANSLATECOORDDATA;
```

An identification of the X requests that fall into the category of Window Information Functions and description of the mapping policies used by the translation layer 12 for each request will now be covered. There are fourteen window information function requests that are handled by the translation layer 12; principally: QueryTree, GetWindowAttributes, GetGeometry, QueryPointer, InternAtom, GetAtomName, GetProperty, ListProperties, ChangeProperty, RotateProperties, DeleteProperty, SetSelectionOwner, GetSelectionOwner, and ConvertSelection.

When an X client needs information about the parent and the children of a given window, it issues a QueryTree request to the translation layer 12. The translation layer 12 converts the window ID member to a window handle and submits a ReqQueryTree to the "WINDOWS" front end 14. The "WINDOWS" front end 14 returns a RpyQueryTree.

An X client issues a GetWindowAttributes request to the translation layer 12 when it desires the current attributes of a given window. The translation layer 12 converts the window ID member to a window handle and submits a ReqGetWindowAttributes to the "WINDOWS" front end 14. The "WINDOWS" front end 14 responds with a RpyGetWindowAttributes back to the translation layer 12. To obtain the current geometry of either a window or a pixmap, an X client issues a GetGeometry request to the translation layer 12. The translation layer 12 converts the window ID to a window handle and submits a ReqGetGeometry to the "WINDOWS" front end 14. The "WINDOWS" front end 14 responds to the request with a RpyGetGeometry. An X client issues a QueryPointer request to the translation layer 12 to obtain the current pointer coordinates. The translation layer 12 converts the window ID to a window handle and submits a ReqQueryPointer to the "WINDOWS" front end 14. The "WINDOWS" front end 14 answers the request with a RpyQueryPointer. The structures for such CPQ replies are shown immediately herein below.

```
//
// Front end information
//
typedef struct_WFEINFODATA{
        USHORT      usProtocolMajor;    // Current version 1.0 has this field as 01
        USHORT      usProtocolMinor:    // and this field as 00
        USHORT      usHorzRes;          // Horizontal size of display in pixels
        USHORT      usVertRes;          // Vertical size of display in pixels
        USHORT      usHorzSize;         // Horizontal size of display in millimeters
        USHORT      usVertSize;         // Vertical size of display in millimeters
        USHORT      usBitsPerPixel;     // Bits per pixel for color
        USHORT      usColorPlanes;      // Number of color planes
        USHORT      usNumColors;        // Number of pure colors
        USHORT      usPaletteSupport;   // Zero if no palette manager
        USHORT      usPaletteSize;      // Size of the system palette
        USHORT      usNumReserved;      // Number of colors reserved for "WINDOWS" in the system palette
        USHORT      usColorRes;         // Bits per color (RGB) DACs in lookup table
        USHORT      usPad;              // Pad
        DWORD       dwWinFlags;         // Window flags
        }WFEINFODATA;
//
// Translate coordinates
//
typedef struct_COORDDATA{
        BOOL        bSameScreen;        // Always TRUE
        HWND        hWndChild;          // Window handle or NONE
        POINT       pt;                 // Converted point
        }COORDDATA;
//
// Query tree
//
typedef struct_TREEDATA{
        HWND        hWndDesktop;        // Desktop window
        HWND        hWndParent;         // Parent window or NONE
        USHORT      usNumChild;         // Number of children
        HWND        hWndChild[126];     // Children
        }TREEDATA;
//
// Get geometry
//
typedef struct_GEOMETRYDATA{
        HWND        hWndDeskt           // Desktop window op;
        SHORT       X;
        SHORT       Y;
        SHORT       sWidth;
        SHORT       sHeight;
        SHORT       sDepth;             // Fixed by hardware
        SHORT       sBorderWidth;       // Always zero
        }GEOMETRYDATA;
//
// Query pointer
//
typedef struct_POINTERDATA{
        HWND        hWndDesktop;        // Desktop window
        HWND        hWndClild;          // Child window or NONE
        SHORT       XRoot;
        SHORT       YRoot;
        SHORT       XWin;
        SHORT       YWin;
        BOOL        bSameScreen;        // Always TRUE
        SHORT       sInputState;        // Keyboard and button state
        }POINTERDATA;
//
// Enumerate font names
//
typedef struct_FONTNAMESDATA{
        SHORT       sNumberOfNames;
        CHAR        szFaceNames[sNumberOfNames][32];
        }FONTNAMESDATA;
//
// Enumerate fonts
//
typedef struct_FONTNAMESDATA{
        SHORT       sNumberOfFonts;
        LOGFONT     lf[sNumberOfFonts];
        }FONTNAMESDATA;
//
```

```
// Get text metrics
//
typedef struct_TEXTMETRICSDATA{
    NEWTEXTMETRICS ntm;
    }TEXTMETRICSDATA;
//
// Get text extents
//
//
// Get window text
//
typedef struct_WINDOWTEXTDATA{
    SHORT     sCount;
    CHAR      cbText[80];
    }WINDOWTEXTDATA;
```

Because of different atom semantics between "MICROSOFT WINDOWS" and "X WINDOWS", all atom manipulation is performed by the translation layer 12, independent of the "WINDOWS" front end 14. It should be noted that all of the X Server code for handling atoms would be moved to the translation layer 12.

Properties are used to associate information with a particular window (e.g., a program name, icon name, icon size, resize hints or program-specific data). Since property operations can consume large amounts of system memory, and because most properties do not have a corresponding entity in the "MICROSOFT WINDOWS" world, property operations are emulated in the translation layer 12. The translation layer 12 is responsible for maintaining all property lists and their atoms. The translation layer 12 does not communicate with the "WINDOWS" front end 14 for property operations and operates independently of it, except for the following properties: WM_NAME, WM_HINTS, and WM_NORMAL_HINTS. For these properties, the translation layer 12 submits one of the following requests: ReqSetWindowText, ReqGetWindowText, ReqSetWindowAttributes or ReqGetWindowAttributes. The translation layer 12 submits a PropertyNotify event to the X client after sending either ReqSetWindowText or ReqSetWindowAttributes to the "WINDOWS" front end 14. According to one embodiment of the present invention, most of the X Server code for handling properties would be moved to the translation layer 12.

The one X request that falls into the category of Mouse Functions, GetMotionEvents will now be described. When an X client desires all of the events in the motion history buffer, it issues a GetMotionEvents request to the translation layer 12. To keep the housekeeping of mouse events to a minimum, the "WINDOWS" front end 14 does not provide a motion history buffer. Therefore, the translation layer 12 returns NULL to the X client.

The design philosophy of the CPQ server 10 for mapping textual information will now be described, including a discussion of the font technologies used under "X WINDOWS" and "MICROSOFT WINDOWS", a description of the approach taken by the CPQ server 10 to honor font requests, and the identification of the X requests that fall into the category of Text Functions.

A font is a collection of images (typically characters) that are used by applications to display useful information to the user. There are several different kinds of font technologies to display and print text; they include raster, vector and outline. Under "X WINDOWS", raster fonts are used. Raster fonts are stored as bitmaps and are designed for output devices of a particular resolution. In the X server distribution, 75 DPI and 100 DPI fonts are supplied. The problems with raster fonts are many and are particularly troublesome under X.

One problem with raster fonts is that they look best only on the output device for which they were designed (i.e., text on a video display) when printed, may not look as good or even the same. In addition, raster fonts require large amounts of disk space, especially for large point sizes. Under "X WINDOWS", the problem is further exacerbated because the X server provides no intelligence to synthesize common characteristics such as underline or to allow a change in point size. A separate font is needed for different point sizes and characteristics for each family.

Under "WINDOWS", three font technologies exist: raster, vector and outline. Raster fonts under "WINDOWS" suffer from the same problems mentioned above, except that "WINDOWS" reduces the number of font files required for a given family by allowing the GDI to synthesize bold, italic, underline and strikeout characteristics and by allowing the GDI to change the size of a raster font. However, aliasing problems can make the output less attractive. Vector fonts are stored as a collection of GDI calls and are useful when rendering to a device that does not support raster technology, i.e., plotters. Vector fonts are also useful when displaying very large characters or characters at some arbitrary angle. Because vector fonts are constructed from GDI calls, they do, however, require more time to render than raster fonts. TrueType is an outline font technology that was introduced in Windows 3.1. Outline fonts are stored as a collection of points and hints. The hints are algorithms used to improve the appearance of the bitmap, at specific resolutions. With TrueType, high-quality fonts at any size, at any angle on any display device can be rendered.

As stated in the objective, the primary goal of the server is to use the minimum amount of system resources found on the desktop to perform a particular task. By requiring modest desktop hardware, a broader market segment is made available. Using this philosophy, the CPQ Server will honor font requests by employing the "MICROSOFT WINDOWS" font mapper and those fonts that are shipped with "WINDOWS" instead of relying on the fonts supplied with the standard X11R4 server. Requests are rendered with a TrueType font, if in a rare case it is unsuccessful, a raster font is used instead. For the set of X fonts that are shipped with the X11R4 server that are not inherent to "MICROSOFT WINDOWS", font substitution is performed by the translation layer 12. In those special cases where it is know before hand that a certain X font is required for the application to run, then a utility to convert "X WINDOWS" BDF font files to "MICROSOFT WINDOWS" FON font files will be provided. In the highly unlikely case that the "WINDOWS" front end 14 is unable to find a suitable font for a request and no convened X fonts can be located, then the default "MICROSOFT WINDOWS" System font, which is a proportionally spaced raster font, will be used.

There are five text function requests that are presently handled by the translation layer 12, including: OpenFont, CloseFont, QueryFont, PolyText8 and ImageText8 Other text function requests, such as ListFonts, ListfontsWithInfo, SetfontPath, GetfontPath, QueryTextExtents PolyText16 and ImageTextI6, could be implemented by anyone of ordinary skill in the art as described herein below. The following is a brief overview of the steps taken by the translation layer 12 to complete each of the above twelve requests.

When an X client issues a OpenFont request to the translation layer 12 to load a given font, the translation layer 12 will determine if font substitution is needed. If so, the substituted font is submitted in a ReqCreateFont request to the "WINDOWS" front end 14. If font substitution is not required, the translation layer 12 parses the supplied font name and extracts the necessary information to form a ReqCreateFont request which is then sent to the "WINDOWS" front end 14. In either case, the "WINDOWS" front end 14 responds either with a NULL or a handle to the font. To close a previously opened font, an X client submits a CloseFont request to the translation layer 12. The translation layer 12 locates the font handle from the supplied font ID and transmits a ReqDestroyFont to the "WINDOWS" front end 14. The SetfontPath and GetfontPath requests serve no particular purpose to the CPQ server 10 since font requests are always honored by using the native "MICROSOFT WINDOWS" fonts which are always placed in the "WINDOWS" systems directory. So these requests have essentially no impacts (i.e., they are "no ops"). When an X client issues a ListFonts request to the translation layer 12 to list all of the available fonts on the server, the translation layer 12 will send a ReqEnumFontNames request to the "WINDOWS" front end 14. It is the responsibility of the translation layer 12 to construct X logical font description (XLFD) compliant strings from the font names returned by the "WINDOWS" front end 14. When an X client issues a ListFontsWithInfo request to the translation layer 12 to obtain the names and information about available fonts on the server, the translation layer 12 will submit a ReqEnumFonts request to the "WINDOWS" front end 14. Font names returned from the "WINDOWS" front end 14 are converted to XLFD compliant strings by the translation layer 12 before delivery to the X client. When an X client sends a QueryFont request to the translation layer 12 to obtain information about a specific font, it sends a ReqGetTextMetrics request to the "WINDOWS" front end 14. When an X client sends a QueryTextExtents to the translation layer 12 to obtain the dimensions of a bounding rectangle of a character string for a given font, the translation layer 12 transmits a ReqGetTextExtents request to the "WINDOWS" front end 14. When an X client sends a PolyText8 request to the translation layer 12 to draw 8-bit characters in a drawable, the translation layer 12 determines if the drawable is a pixmap or a window and sets the Window flag of the TEXTOUTDATA structure appropriately before it issues a ReqTextOut request to the "WINDOWS" front end 14. When an X client sends an ImageText8 request to the translation layer 12 to draw text composed of 8-bit characters in which both the foreground and background bits of each character are painted, the translation layer 12 determines if the drawable is a pixmap or a window and sets the Window flag of the FULLTEXTOUTDATA structure appropriately before it issues a ReqFullTextOut request to the "WINDOWS" front end 14. Illustrative structures are shown immediately herein below.

```
//
// Create font
//
typedef struct_CREATEFONTDATA{
        HWND        hWnd;
        LOGFONT     lfFont;
        }CREATEFONTDATA;
    typedef struct_TEXTOUTDATA(
        HWND        hWnd;
        USHORT      X;
        USHORT      Y;
        USHORT      sCount;
        CHAR        CbText[132]; // Based on max packet of 1024
                    bytes.
        }TEXTOUTDATA, FAR *LPTEXTOURDATA;
```

This following identifies the X requests that fall into the category of GC Functions and describes the mapping procedures used by the translation layer 12 for each request. There are several GC function requests that are handled by the translation layer 12, including: CreateGC, ChangeGC, and FreeGC. Under X windows, a Graphics Context (GC) is a data structure where drawing information is contained, e.g., the color of the foreground pixel, current font, etc. Likewise, a Device Context (DC) under "MICROSOFT WINDOWS" is used as a place for keeping drawing information. "X WINDOWS" applications create multiple GCs to quickly change drawing attributes, i.e., fonts and colors for a particular window. "MICROSOFT WINDOWS" has a cache of five DCs that can be used by applications for drawing purposes. However, the DCs obtained from the cache must be released after the drawing process is completed. If the DC is not release serious system problems will occur. Any non-default drawing attributes that were used are lost when the DC is released and must be reloaded when it is time to redraw. To avoid reloading, a private DC can be associated with each Microsoft window. By associating a private DC to each window, drawing attributes do not have to be loaded for the window, thereby giving a performance boost. However, this approach comes with a penalty. Space for the DC is allocated from one of "MICROSOFT WINDOWS" internal system heaps. Creating many windows (e.g., >50) can deplete the heap. In addition, X clients used very few GCs during the lifetime of an application and the ratio of windows to GCs is significant. Therefore, the "WINDOWS" front end 14 emulates the GC structures on the PC. GC structures are allocated dynamically from the PC's memory and are identified by a memory handle. Any reference to the GC by the translation layer 12 is made with this handle. The "WINDOWS" front end 14 uses the GC handle to locate the data structure in memory. Since most drawing primitives do not require every component of the GC in order to perform their operation, only those components that are needed are loaded into the DC at the time of the drawing request. The translation layer 12 will be responsible for maintaining the necessary data structures to go between GC IDs and GC handles.

The following is a brief overview of the steps taken by the translation layer 12 to complete each of the seven GC requests.

A CreateGC is submitted to the translation layer 12 when an X client desires a new graphics context. The translation layer 12 issues a ReqCreateGC request to the "WINDOWS" front end 14. If successful, a handle to the GC is returned; if not, NULL is returned. To copy components from a source GC to a destination GC, an X client submits a CopyGC request to the translation layer 12. The translation layer 12 locates the corresponding handles from the IDs and issues a ReqCopyGC request to the "WINDOWS" front end 14. To change a component in a given GC, an X client submits a ChangeGC request to the translation layer 12. The translation layer 12 locates the GC handle and submits a ReqChangeGC request to the "WINDOWS" front end 14. To release all memory associated with a given GC, an X client submits a FreeGC request to the translation layer 12. The translation layer 12 locates the GC handle and submits a ReqDestroyGC to the "WINDOWS" front end 14. An X client submits a SetClipRectangles request to the translation layer 12 to change the clipping region for a given GC. The translation layer 12 locates the GC handle and submits a ReqSetClippingRegion to the "WINDOWS" front end 14.

This section identifies the X requests that fall into the category of Graphics Functions and describes the mapping procedures used by the translation layer 12 for each request. There are a plurality of requests for graphics primitives that are handled by the translation layer 12, including: ClearArea, CopyArea, PolyPoint, PolyLine, PolySegment, PolyRectangle, PolyArc, FillPoly, PolyFillRectangle, PolyFillArc, CreatePixmap and FreePixmap. Since both environments are similar, many of the mapping routines only have to submit a corresponding call to the "WINDOWS" front end 14 to satisfy the X request. By allowing the "WINDOWS" routines to perform the rendering, fast speed-consistent drawing operations can be performed. Because the routines are submitted to the "WINDOWS" front end 14 as high-level calls, no changes to the translation layer 12 need to occur when the "WINDOWS" front end 14 code is moved to a different environment, i.e., "WINDOWS NT". In fact the translation layer 12 can simultaneously be communicating with PCs running "WINDOWS 3.1" and "WINDOWS NT" with no code changes. It should be noted at this juncture that a tradeoff would be made when "exact" pixel rendering is needed. In such cases, the user would choose the option to use the normal X drawing algorithms, and of course a performance hit would occur by doing so. The X drawing routines would reside on the PC side in a DLL and would only be loaded into memory when requested. An X client submits a ClearArea request to the translation layer 12 to clear a rectangular area in a given window. The translation layer 12 converts the supplied width and height parameters to the point x2, y2 that represent the lower right hand corner of the bounding rectangle. The translation layer 12 also maps the supplied window ID to a window handle and issues a ReqClearArea request to the "WINDOWS" front end 14. When the translation layer 12 receives a CopyArea request from an X client the parameters are passed unmodified and a ReqCopyArea is submitted to the "WINDOWS" front end 14. When the translation layer 12 receives a CopyPlane request from an X client the parameters are passed unmodified and a ReqCopyPlane is submitted to the "WINDOWS" front end 14. It should be noted that, as one of ordinary skill in the art would be aware and able to do so, this routine will require X code in order to perform the DLL operation (DLL). The X client submits a PolyPoint request to the translation layer 12 to draw multiple points in a given drawable. The translation layer 12 passes the point coordinates unmodified to the "WINDOWS" front end 14. The translation layer 12 identifies the drawable ID is a pixmap or a window and sets the flag Window in the structure POLYPOINTDATA appropriately. The translation layer 12 also maps the drawable ID to the appropriate handle type before submitting a ReqPolyPoint request to the "WINDOWS" front end 14. To draw multiple lines in a given drawable, an X client submits a PolyLine request to the translation layer 12. The translation layer 12 passes the line coordinates unmodified to the "WINDOWS" front end 14. The translation layer 12 identifies the drawable ID as either a pixmap or a window and sets the flag bIsWindow in the structure POLYLINEREQUESTDATA appropriately. The translation layer 12 also maps the drawable ID to the correct handle type before submitting a ReqPolyLine request to the "WINDOWS" front end 14. To draw multiple unconnected lines in a given drawable, an X client submits a PolySegment request to the translation layer 12. The translation layer 12 passes the segment coordinates unmodified to the "WINDOWS" front end 14. The translation layer 12 identifies the drawable ID as either a pixmap or a window and sets the flag bIsWindow in the structure POLYSEGMENTREQUESTDATA appropriately. The translation layer 12 also maps the drawable ID to the correct handle type before submitting a ReqPolySegment request to the "WINDOWS" front end 14. An X client submits a PolyArc request to the translation layer 12 to draw multiple arcs in a given drawable. The translation layer 12 converts the starting angle of the arc to the point x3, y3 that defines the arc's starting point. Likewise, the ending angle of the arc is converted to the point x4, y4 that defines the arc's endpoint. The translation layer 12 identifies the drawable ID as either a pixmap or a window and sets the flag bIsWindow in the structure POLYARCREQUESTDATA appropriately. The translation layer 12 also maps the drawable ID to the correct handle type before submitting a ReqPolyArc request to the "WINDOWS" front end 14. An X client submits a PolyFillArc request to the translation layer 12 to fill multiple arcs in a given drawable. The translation layer 12 converts the starting angle of the arc to the point x3, y3 that defines the arc's starting point. Likewise, the ending angle of the arc is converted to the point x4, y4 that defines the arc's endpoint. The translation layer 12 identifies the drawable ID as either a pixmap or a window and sets the flag bIsWindow in the structure POLYARCREQUESTDATA appropriately. The translation layer 12 also maps the drawable ID to the correct handle type before submitting a ReqPolyArc request to the "WINDOWS" front end 14. An X client submits a PolyRectangle request to the translation layer 12 to draw the outline of multiple rectangles in a given drawable. The translation layer 12 converts the supplied width and height parameters to the point x2, y2 that represent the lower right hand corner of the bounding rectangle. The translation layer 12 identifies the drawable ID as either a pixmap or a window and sets the flag bIsWindow in the structure POLYRECTANGLEREQUESTDATA appropriately. The translation layer 12 also maps the drawable ID to the correct handle type before submitting a ReqRectangle request to the "WINDOWS" front end 14. An X client submits a PolyFillRectangle request to the translation layer 12 to fill multiple rectangular areas in a given drawable. The translation layer 12 converts the supplied width and height parameters to the point x2, y2 that represent the lower right hand corner of the bounding rectangle. The translation layer 12 identifies the drawable ID as either a pixmap or a window and sets the flag bIsWindow in the structure POLYRECTANGLEREQUESTDATA appropriately. The translation layer 12 also maps the drawable ID to the correct handle type before submitting a ReqFillRectangle request to the "WINDOWS" front end 14. An X client submits a Polygon request to the translation layer 12 to fill a polygon area in a given drawable. The translation layer 12 passes the point coordinates unmodified to the "WINDOWS" front end 14. The translation layer 12 identifies the drawable ID as either a pixmap or a window and sets the flag bIsWindow in the structure POLYPOINTREQUESTDATA appropriately. The translation layer 12 also maps the drawable ID to the correct handle type before submitting a ReqPolygon request to the "WINDOWS" front end 14. The CLEARAREAREQUESTDATA, COPYAREAREQUESTDATA, POLYPOINTREQUESTDATA, POLYLINERREQUESTDATA, POLYSEGMENTREQUESTDATA, POLYARCREQUESTDATA, and POLYRECTANGLEREQUESTDATA structures are shown immediately herein below.

```
typedef struct_CLEARAREAREQUESTDATA {
        HWND        hWnd;
        SHORT       X;
        SHORT       Y;
        USHORT      usWidth;
        USHORT      usHeight;
        BOOL        bPaint;
        }CLEARAREAREQUESTDATA, FAR *LPCLEARAREAREQUESTDATA;
typedef struct_COPYAREAREQUESTDATA {
        BOOL        bSrcIsWindow;
        BOOL        bDestIsWindow;
        HANDLE      hSrc;
        HANDLE      hDest;
        HGC         hGC;
        USHORT      usPad;
        SHORT       XSrc;
        SHORT       YSrc;
        SHORT       XDest;
        SHORT       YDest;
        USHORT      usWidth;
        USHORT      usHeight;
        }COPYAREAREQUESTDATA, FAR *LPCOPYAREAREQUESTDATA;
typedef struct_POLYPOINTREQUESTDATA {
        BOOL        bIsWindow;
        HANDLE      hDest;
        HANDLE      hGC;
        USHORT      usPoints;
        ULONG       ulpad;
        }POLYPOINTREQUESTDATA, FAR *LPPOLYPOINTREQUESTDATA;
typedef struct_POLYLINEREQUESTDATA {
        BOOL        bIsWindow;
        HANDLE      hDest;
        HANDLE      hGC;
        USHORT      usPoints;
        ULONG       ulPad;
        }POLYLINEREQUESTDATA, FAR *LPPOLYLINEREQUESTDATA;
typedef struct_POLYSEGMENTREQUESTDATA {
        BOOL        bIsWindow;
        HANDLE      hDest;
        HANDLE      hGC;
        USHORT      usSegments;
        ULONG       ulPad;
        }POLYSEGMENTREQUESTDATA, FAR *LPPOLYSEGMENTREQUESTDATA;
typedef struct_POLYRECTANGLEREQUESTDATA
        BOOL        bIsWindow;
        HANDLE      hDest;
        HANDLE      hGC;
        USHORT      usRectangles;
        ULONG       ulPad;
        }POLYRECTANGLEREQUESTDATA, FAR *LPPOLYRECTANGLEREQUESTDATA;
typedef struct_POLYARCREQUESTDATA
        BOOL        bIsWindow;
        HANDLE      hDest;
        HANDLE      hGC;
        USHORT      usArcs;
        }POLYARCREQUESTDATA, FAR *LPPOLYARCREQUESTDATA;
typedef struct_POLYGONREQUESTDATA {
        BOOL        bIsWindow;
        HANDLE      hDest;
        HANDLE      hGC;
        USHORT      usPoints;
        ULONG       ulPad1;
        ULONG       ulPad2;
        }POLYGONREQUESTDATA, FAR *LPPOLYGONREQUESTDATA;
typedef struct_POLYFILLRECTANGLEREQUESTDATA {
        BOOL        bIsWindow;
        HANDLE      bDest;
        HANDLE      hGC;
        USHORT      usRectangles;
        ULONG       ulPad;
        }POLYFILLRECTANGLEREQUESTDATA, FAR *LPPOLYFILLRECTANGLEREQUESTDATA;
typedef struct_POLYFILLARCREQUESTDATA {
        BOOL        bIsWindow;
        HANDLE      hDest;
        HANDLE      hGC;
```

```
        USHORT     usArcs;
        }POLYFILLARCREQUESTDATA, FAR *LPPOLYFILLARCREQUESTDATA:
//
// Copy area
//
typedef struct_COPYAREADATA {
        BOOL       bWindowSrc;
        BOOL       bWindowDest;
        HANDLE     hSrc;
        HANDLE     hDest;
        SHORT      XDest;
        SHORT      YDest;
        SHORT      sWidth;
        SHORT      sHeight;
        SHORT      XSrc;
        SHORT      YSrc;
        }COPYAREADATA;
```

For support of the CoordModePrevious operation, the points are translated to values relative to the origin before delivery to the "WINDOWS" front end 14.

When the translation layer 12 receives a PutImage request from an X client, it converts the XImage data to the "MICROSOFT WINDOWS" bitmap format and issues a ReqPutBitmap request to the "WINDOWS" front end 14.

When the translation layer 12 receives a GetImage request from an X client, it issues a ReqGetBitmap request to the "WINDOWS" front end 14. The returned bitmap data is converted to the XImage format by the translation layer 12 before returning the data to the X client.

An X client submits a CreatePixmap request to the translation layer 12 to create a pixmap of a given size. The translation layer 12 identifies the drawable ID as either a pixmap or a window and sets the flag bWindow in the structure CREATEBITMAPDATA appropriately. The translation layer 12 also maps the drawable ID to the correct handle type before submitting a ReqCreateBitmap request to the "WINDOWS" front end 14. An X client submits a FreePixmap request to the translation layer 12 to free all memory associated with a given pixmap. The translation layer 12 takes the pixmap ID and locates the corresponding bitmap handle and submits a ReqDestroyBitmap request to the "WINDOWS" front end 14. An illustrative CREATE-BITMAPREQUESTDATA structure is shown immediately herein below.

display device (screen) always has a default colormap and programs typically allocate entries out of this colormap. Depending on the hardware, the colormap may not be a fully independent colormap and only certain allocations may work or the display device may support multiple colormaps simultaneously. Colormaps are tied to a particular display device and X categories the color capabilities of a display device into visuals. There are six possible visual types: StaticGray, GrayScale, StaticColor, PseudoColor, TrueColor or DirectColor. Basically, StaticGray, StaticColor and DirectColor have predefined, read-only RGB values in their colormaps, while PseudoColor, GrayScale, and DirectColor have read/write capabilities.

The representation of color on the screen under "MICROSOFT WINDOWS" is done through the use of color palettes. Color palettes act as a buffer between the application and the system and provide a device independent method of accessing the color capabilities of a display device by managing the physical or system palette of the device. Typically, devices that can display at least 256 colors use a system palette. Display devices such as VGA are not supported by the palette manager since they can only support 16 simultaneous colors on the screen.

Applications employ the system palette through the use of logical palettes. Each entry in the system palette contains a specific color. Applications use the logical palette to specify a particular color instead of an explicit value. When an

```
typedef struct_CREATEBITMAPREQUESTDATA {
        USHORT     usWidth;
        USHORT     usHeight;
        }CREATEBITMAPREQUESTDATA, FAR *LPCREATEBITMAPREQUESTDATA;
```

This section discusses the color model used by the CPQ Server. The discussion is divided into three parts. The first part describes the color models presently implemented under "X WINDOWS" and "MICROSOFT WINDOWS". This is followed by a description of how color is supported under the CPQ Server. The third part identifies the X requests that fall into the category of Color Functions and describes the mapping procedures used by the translation layer 12 for each request.

Color mapping under "X WINDOWS" is performed through the use of a colormap which consists of entries defining color (RGB) values. As each pixel value is read out of the display memory, it is used to index the colormap to produce an RGB value. Depending on the display hardware, one or more colormaps can be installed at one time. A application request that its logical palette be given its requested colors, "WINDOWS" matches all of the entries in the logical palette to the system palette. If an entry in the logical palette can not be matched in the system palette, then the entry is placed in an unused location in the system palette.

Because more than one application can use a logical palette, it is possible that the total number of colors to be displayed can exceed the capacity of the system palette. If this occurs, "MICROSOFT WINDOWS" mediates between the applications. "WINDOWS" always satisfies color requests of the foreground window first; this ensures that the active window has the best possible color display. For the remaining windows, "WINDOWS" satisfies the requests of window that was most recently active and continues until all of the windows are processed.

Figure 11:
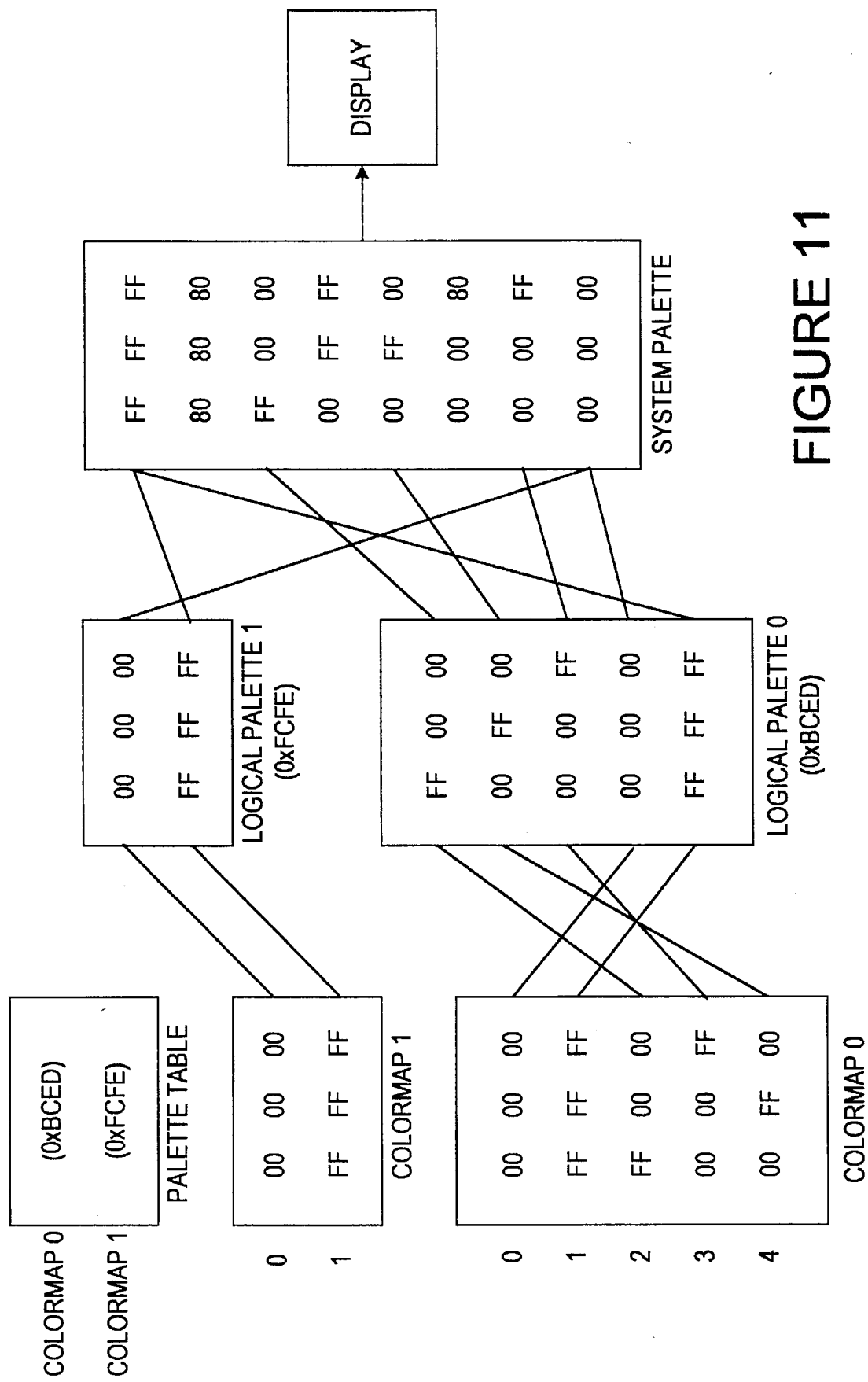
FIG. 11 demonstrates how color mapping is performed when palette management is supported on the PC.

How color support is handled under the CPQ server 10 is based on the capabilities of the display hardware. If the display device is capable of employing logical palettes, the CPQ server 10 employs the "MICROSOFT WINDOWS" palette manager to translate colormap entries. The translation layer 12 is responsible for accepting colormap requests from X clients and transforming those requests into palette functions. It is also responsible for maintaining lists of palette handles and colormap IDs. The "WINDOWS" front end 14 cooperates with the translation layer 12 by supplying information concerning screen geometry and the number of pure colors supported by the display hardware. FIG. 11 illustrates how color mapping is performed when palette management is supported on the PC.

When an X client requests that a colormap be created, the translation layer 12 allocates space locally for it and submits a request to the "WINDOWS" front end 14 to create a logical palette. The "WINDOWS" front end 14 responses to the request with a palette handle which is retained by the translation layer 12 and is used in all other palette operations. When an X client requests a new color, an entry is allocated in the local copy of the colormap and in the logical palette on the PC.

Figure 12:
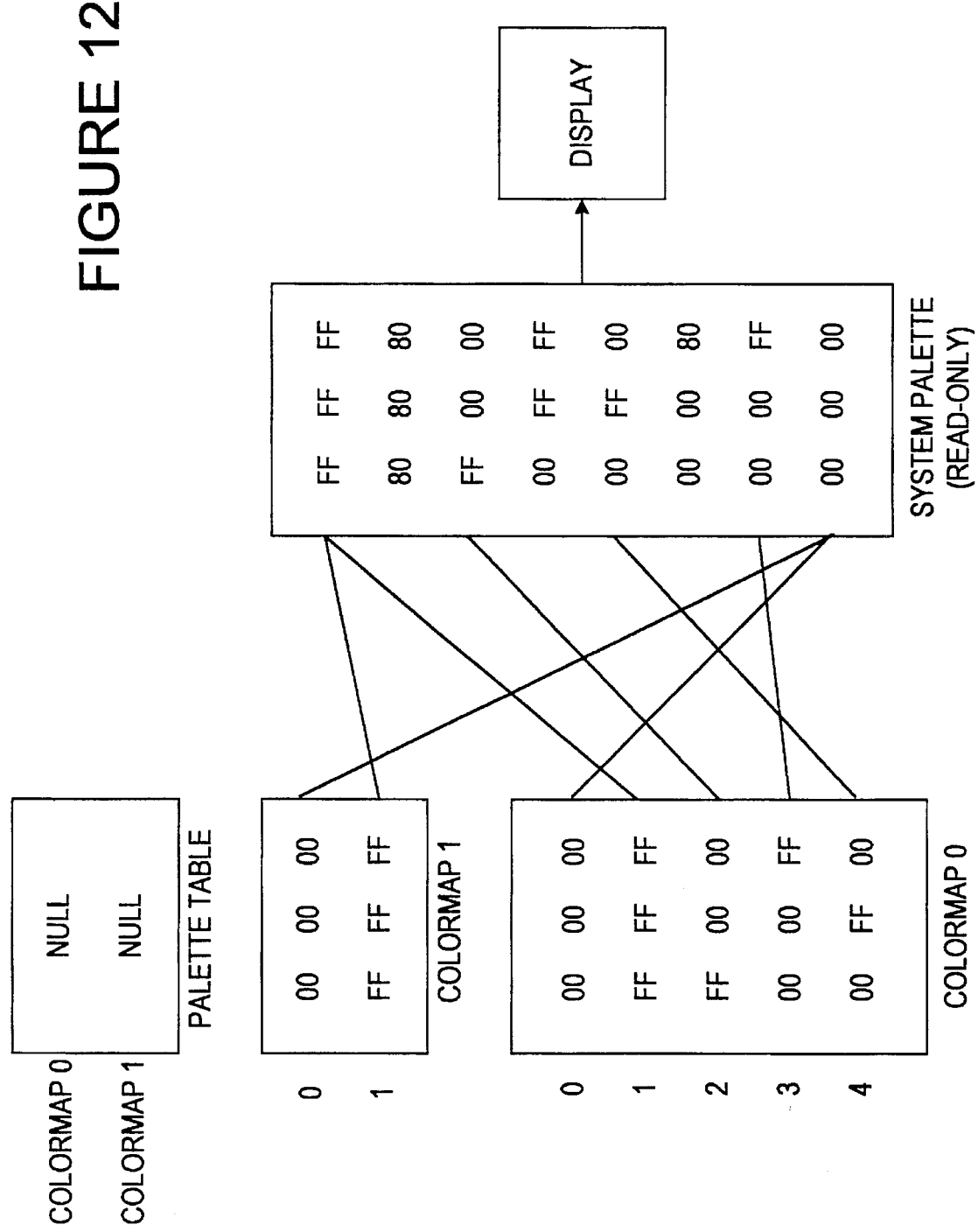
FIG. 12 shows how color mapping is performed when palette management is not supported on the PC.

On display hardware with fixed color values, the model is reduced to that shown in FIG. 12. In this model, logical palettes are not used. Instead, RGB values in the colormaps are matched to the nearest color in the system palette.

It is important to note that in both cases the color presented to the "WINDOWS" front end 14 is always constructed as an RGB value. By encoding the values in RGB format, the colormap mechanisms and semantics are contained within the translation layer 12 and not allow to propagate to the "WINDOWS" front end 14. It is also noteworthy to point out that the first case represents display hardware that allows an application to manipulate the representation of color on the screen while the second shows applications that are force to represent a given color from a limited set of values located in a fixed color array.

Table VIII below shows the relationship between visuals, CPQ display hardware, palette manager support and palette attribute.

TABLE VIII

| X Visual | Display Hardware | Palette Manager Support | Palette Attribute |
| --- | --- | --- | --- |
| StaticGray | VGA | No | Read-only |
| StaticColor | VGA | No | Read-only |
| GrayScale | Q-Vision | Yes | Read/Write |
| PseudoColor | Q-Vision | Yes | Read/Write |

The visual StaticGray has only two entries in a colormap for VGA display hardware and can be thought of as monochrome. The CPQ server 10 will always default to the highest visual supported by the hardware, so for VGA display hardware the default visual is StaticColor and for Q-vision the default is PseudoColor.

The visuals TrueColor and DirectColor are not supported by the CPQ server 10 due to their method of addressing the RBG lookup tables.

There are a number of color function requests which may be handled by the translation layer 12, including: CreateColormap, CopyColormapandFree, FreeColormap, AllocColor, AllocNamedColor, LookupColor, AllocColorCells, AllocColorPlanes, StoreColors, StoreNamedColor, FreeColors and QueryColor.

When a CreateColormap request is received by the translation layer 12, an X client is requesting that a colormap be created for a given screen. The translation layer 12 allocates space locally for the colormap based on the requested size. If palette management support is available on the PC, a ReqCreatePalette request is submitted to the "WINDOWS" front end 14 and a handle to the palette is returned. If palette management is not supported on the PC, then no request is submitted. In either case, the translation layer 12 returns a colormap ID to the X client.

When a CopyColormapAndFree request is received by the translation layer 12 a new colormap is created locally from the supplied colormap ID and the new colormap ID is returned to the X client. The translation layer 12 moves all existing entries from the specified colormap to the new colormap and frees the entries in the old colormap. If palette management support is present on the PC, a ReqDestroyPalette is issued for the old colormap and a ReqCreatePalette is issued to create the new colormap with the old colormap values. A palette handle is returned to the translation layer 12 from the ReqCreatePalette request and is used for any additional calls dealing with the palette manager. If palette management is not supported, no requests are sent to the "WINDOWS" front end 14.

When a FreeColormap request is received by the translation layer 12 all association between the specified colormap ID and colormap is eliminated and all memory associated with the specified colormap is freed. If palette management support is present on the PC, a ReqDestroyPalette request is submitted to the "WINDOWS" front end 14.

To allocate a read-only color cell in a given colormap, an X client submits a AllocateColor request to the translation layer 12. The translation layer 12 (locally) allocates a read-only colormap entry corresponding to the closest RGB value supported by the hardware. To retrieve the best color approximation, the translation layer 12 sends a ReqGetNearestColor request to the "WINDOWS" front end 14 which responses with the best match for the specified RGB value.

When an AllocNamedColor request is received by the translation layer 12, an X client is wanting to allocate a read-only cell by name. The translation layer 12 looks up the color (from a local disk file) with respect to the screen that is associated with the specified colormap. It returns both the database definition of the color (retrieved from a local disk file) and the closest color (using ReqGetNearestColor)supported on the PC.

When a LookupColor request is received by the translation layer 12, an X client desires the string name of a color with respect to a screen associated with the specified colormap. It returns the exact database value (retrieved from a local disk file) and the closest color (using ReqGetNearestColor) supported on the PC.

When a StoreColors request is received by the translation layer 12 the RGB values are updated in the local copy of the colormap according to the pixel values specified and a ReqSetPaletteEntries request is sent to the "WINDOWS" front end 14.

To set the color of a pixel to a named color, an X client submits a StoreNamedColor request to the translation layer 12. The translation layer 12 looks up the named color with respect to the screen associated with the colormap and stores the result in the specified colormap. It also submits a ReqSetPaletteEntries request with the looked up database RGB value to the "WINDOWS" front end 14.

When the request, FreeColor, is received by the translation layer 12 an X client wants to free entries in a given colormap. The translation layer 12 eliminates those entries represented by pixels whose values are supplied in a pixel array. In addition, the translation layer 12 updates the PC copy by sending a ReqResizePalette request to the "WINDOWS" front end 14.

When a QueryColor request is received, the translation layer 12 returns the RGB values for each pixel specified. The translation layer 12 uses the local copy of the colormap to retrieve the database RGB value and then sends a ReqGetNearestColor to the "WINDOWS" front end 14 to obtain the hardware-specific RGB value.

This section identifies the X requests that fall into the category of Cursor Functions and describe the mapping procedures used by the translation layer 12 for each request. There are four cursor function requests that may be handled by the translation layer 12, including: CreateGlyphCursor, CreateCursor, RecolorCursor and FreeCursor.

An X client submits a CreateGlyphCursor request to the translation layer 12 to create a cursor from a font. X provides a set of standard cursor shapes in a special font named cursor. (The cursor font file is located on the machine running the translation layer 12 daemon.) The translation layer 12 locates the glyph to be used and converts the glyph to a bitmap and sends a ReqCreateBitmapCursor to the "WINDOWS" front end 14. The "WINDOWS" front end 14 will respond with a handle to the cursor or NULL. An X client submits a CreateCursor request to the translation layer 12 to create a cursor from two bitmaps. The translation layer 12 converts the X bitmaps to "MICROSOFT WINDOWS" bitmaps and issues a ReqCreateBitmapCursor to the "WINDOWS" front end 14. While recoloring the cursor may not be supported in a "MICROSOFT WINDOWS" environment, due to the inherent limitations within that environment, such recoloring could be supported in other windowing environments by one of ordinary skill in the art.

An X client submits a FreeCursor request to the translation layer 12 to destroy a given cursor. The translation layer 12 locates the proper cursor handle from the cursor ID and issues a ReqDestroyBitmapCursor. It should be noted that cursor dimensions are limited to 32×32 pixels because of inherent limitations in the "MICROSOFT WINDOWS" environment.

Under X windows, keyboard grabs, mouse grabs and even server grabs can take place to allow exclusive use the system resource by an "X WINDOWS" application. In general, grabs are not intended for normal applications, but are intended for window managers. They are also very problematic. If an "X WINDOWS" application performs a grab and then crashes it could potentially leave the PC in an unusable state, requiring the power to be cycled. Therefore, a grab of any resource will be considered an invalid operation under the CPQ server 10. It should be noted that this may cause compatibility problems because certain X applications use grabs to prevent race conditions.

All keyboard events are transmitted to the translation layer 12 by the "WINDOWS" front end 14 when the appropriate event mask is set for the window. The keycodes passed to the translation layer 12 are not tied to a particular keyboard but are instead virtualized.

This section identifies the X requests that do not fall into any particular category, including: QueryExtension, ListExtensions, and SendEvent.

The particular event reported to the translation layer 12 from the "WINDOWS" front end 14 depends on which bits of the event mask are set in the dwEventMask member of a window. Event mask definitions are shown in the aforementioned Table 1. The dwEventMask member is analogous to the X event mask except where noted. The following sections describe in detail the mapping process that occurs when a specific event mask is selected. Each section will identify the X events associated with a particular category and will explain how the translation layer 12 will convert the events generated by the "WINDOWS" front end 14 into X events that the "X WINDOWS" application will use.

This section identifies the X events that fall into the Keyboard and Mouse category and describes the mapping policies used by the translation layer 12 for each event. Five keyboard and mouse events are handled by the translation layer 12, including: KeyPress, KeyRelease, ButtonPress, ButtonRelease and MouseMove.

The events EvtKeyDown and EvtKeyUp are generated by the "WINDOWS" front end 14 when an "X WINDOWS" application is wanting information about when keys change state. The translation layer 12 uses the information supplied in the data portion of the CPQ event to fill in the members of an XKeyEvent. The events EvtButtonDown and EvtButtonUp are sent to the translation layer 12 when an "X WINDOWS" application is requesting information on when a mouse button changes state. The translation layer 12 uses the information supplied by the "WINDOWS" front end 14 to fill in the data members of an XButtonEvent. Since "X WINDOWS" require three button mice and because most PCs commonly have only two button mice, middle mouse button emulation is needed. Middle mouse button emulation is handled by the "WINDOWS" front end 14 is accomplished by pressing both mouse buttons simultaneously. Mouse events are transmitted to the translation layer 12 by the "WINDOWS" front end 14 when the appropriate event mask is set for the window. All positions are given in logical coordinates relative to the upper left hand corner of the window. It should be noted that, because "MICROSOFT WINDOWS" supports a three-button mouse, the user has the option of choosing. If a three-button mouse is used, no emulation is needed. The "WINDOWS" front end 14 code determines the presence of a three-button mouse at initialization time and disables the middle mouse button emulation code if one is found.

The "WINDOWS" front end 14 reports EvtMouseMove events to the translation layer 12 when an "X WINDOWS" application is wanting information about when the mouse position changes. The translation layer 12 takes the information from the CPQ request and places into the member fields of an XMotionEvent.

This section identifies the X events that fall into the Window Crossing category and discusses the mapping policies used by the translation layer 12 for each event. There two window crossing events that are handled by the translation layer 12, including: EnterWindow and LeaveWindow.

This section identifies the X events that fall into the Input Focus category and describes the mapping algorithm used by translation layer 12 for each event. There are two input focus events in this category, including: FocusIn and FocusOut.

This section identifies the one X event that falls into the Key State Notification category and describes the mapping process used by the translation layer 12. The event is: KeymapNotify.

The "WINDOWS" front end 14 sends an EvtKeyMap event to the translation layer 12 when an "X WINDOWS" application is wanting information about the state of the keyboard. The translation layer 12 takes the 256 byte cbKeyState buffer information from the CPQ event and converts it to the 32 byte key_vector array needed by an XKeyMapEvent.

This section identifies the X events that fall into the Expose category and describes the mapping procedure used by the translation layer 12 for each event. There are three expose events in this category, including: Expose, GraphicsExpose and NoExpose.

The "WINDOWS" front end 14 transmits the event, EvtPaint, to the translation layer 12 when an "X WINDOWS" application requires information about when the contents of a window has been lost. The translation layer 12 takes the information from the event and forms an XExposeEvent. The count member of the XExposeEvent is set to zero. GraphicsExpose and NoExpose events are produced when copying areas.

This section identifies the X events that fall in the category of Window State Notification and discusses the translation of the events by the translation layer 12. There are ten window state notification events that may be handled by the translation layer 12, including: CirculateNotify, ConfigureNotify, CreateNotify, DestroyNotify, GravityNotify, MapNotify, MappingNotify, ReparentNotify, UnmapNotify and VisibilityNotify.

The "WINDOWS" front end 14 transmits the event, EvtCirculate, to the translation layer 12 when an "X WINDOWS" application requires information about when a window changes its position in the stack. The translation layer 12 takes the information from the event and forms an XCirculateEvent.

The event, EvtConfigure, is generated by the "WINDOWS" front end 14 when an "X WINDOWS" application is wanting information about changes to a window's size, position and z order. The translation layer 12 uses the information supplied in the data portion of the CPQ event to fill in the members of an XConfigureEvent.

The event, EvtCreateWindow, is generated by the "WINDOWS" front end 14 when an "X WINDOWS" application is wanting information about the creation of a window. The translation layer 12 uses the information supplied by the event data to form an XCreateWindowEvent.

The event, EvtDestroyWindow, is generated by the "WINDOWS" front end 14 whenever an "X WINDOWS" application destroys a window. The translation layer 12 uses the information supplied by the event to form an XDestroyWindowEvent.

The event, EvtMoveWindow, is generated by the "WINDOWS" front end 14 whenever an "X WINDOWS" application moves a window. The translation layer 12 uses the information supplied by the event to form an XGravityEvent.

The event, EvtShowWindow, is generated by the "WINDOWS" front end 14 whenever an "X WINDOWS" application wants information about when a window is mapped. The translation layer 12 uses the information supplied by the event to form an XMapEvent.

To emulate the X event, MappingNotify, the translation layer 12 will trap on the requests XSetModifierMapping, XChangeKeyboardMapping and XSetPointerMapping and submit the event independent of the "WINDOWS" front end 14. The event, EvtltideWindow, is generated by the "WINDOWS" front end 14 whenever an "X WINDOWS" application wants information about when a window state changes from mapped to unmapped. The translation layer 12 uses the information supplied by the event to form an XUnmapEvent. The KEYEVENTDATA, BUTTONEVENTDATA, MOUSEMOVEDATA, KEYMAPDATA, PAINTEVENTDATA, CONFIGUREDATA, DESTROYWINDOWDATA, MOVEWINDOWDATA, SHOWINDOWEVENTDATA, and HIDEWINDOWDATA structures are shown immediately herein below.

```
typedef struct_KEYEVENTDATA {
        DWORD      dwXWindowID;
        DWORD      dwXChildWindowID;
        LONG       lTime;
        POINT      ptWindow;
        POINT      ptRoot;
        LONG       lState;
        LONG       lKeyCode;
        BOOL       bSendEvent;
        }KEYEVENTDATA, FAR *LPKEYEVEYRDATA;
typedef struct_BUTTONEVENTDATA {
        DWORD      dwXWindowID,
        DWORD      dwXChildWindowID;
        LONG       lTime;
        POINT      ptWindow,
        POINT      ptRoot;
        LONG       lState;
        LONG       lButton;
        BOOL       bSendEvent;
        }BUTTONEVENTDATA, FAR *LPBUTTONEVENTDATA;
//
// Mouse
//
typedef struct_MOUSEMOVEDATA {
        HWND       hWndDesktop; // Desktop
        HWND       hWndEvent;
        EWND       hWndChild;
        LONG       lTime;     // In milliseconds
        BOOL       bSendEvent;
        POINT      ptEvent;
        POINT      ptDesktop;
        LONG       lState;
        }MOUSEMOVEDATA;
//
// Keymap
//
typedef struct_KEYMAPDATA {
```

```
        HWND        hWndEvent;
        LONG        lTime;
        BOOL        bSendEvent;
        CHAR        cbKeyState[256];
        }KEYMAPDATA;
typedef struct_PAINTEVENTDATA {
        DWORD       dwXWindowID;
        SHORT       X;
        SHORT       Y;
        USHORT      usWidth;
        USHORT      usHeight;
        }PAINTEVENTDATA, FAR *LPPAINTEVENTDATA;
typedef struct_SIZEWINDOWEVENTDATA {
        DWORD       dwXWindowID;
        SHORT       X;
        SHORT       Y;
        USHORT      usWidth;
        USHORT      usHeight;
        }SIZEWINDOWEVENTDATA, FAR *LPSIZEWINDOWEVENTDATA;
typedef struct_SHOWWINDOWEVENTDATA {
        DWORD       dwXWindowID;
        }SHOWWINDOWEVENTDATA, FAR *LPSHOWWINDOWEVENTDATA;
typedef struct_HIDEWINDOWEVENTDATA {
        DWORD       dwXWindowID;
        }HIDEWINDOWEVENTDATA, FAR *LPHIDEWINDOWEVENTDATA;
typedef struct_DESTROYWINDOWEVENTDATA {
        DWORD       dwXWindowEventID;
        DWORD       dwXWindowID;
        }DESTROYWINDOWEVENTDATA, FAR *LPDESTROYWINDOWEVENTDATA;
//
// Move Window
//
typedef struct_MOVEWINDOWDATA {
        HWND        hWndEvent;      // Window or Parent
        HWND        hWnd;           // Window destroyed
        BOOL        bSendEvent;     // TRUE if this came from SendEvent
        SHORT       x, y;           // New window location
        }MOVEWINDOWDATA.
//
// Enter Window
//
typedef struct_ENTERWINDOWDATA {
        HWND        hWndRoot;
        HWND        hWndEvent;
        HWND        hWndChild;
        LONG        lTime;
        BOOL        bSendEvent;
        POINT       ptEvent;
        POINT       ptRoot;
        LONG        lstate:
        }ENTERWINDOWDATA;
//
// Leave Window
//
typedef struct_LEAVEWINDOWDATA {
        HWND        hWndRoot;
        HWND        hWndEvent;
        HWND        hWndChild;
        LONG        lTime;
        BOOL        bSendEvent;
        POINT       ptEvent;
        POINT       ptRoot;
        LONG        lState,
        }LEAVEWINDOWDATA;
```

The X event, VisibilityNotify, will not be supported by the CPQ server 10 since "MICROSOFT WINDOWS" does not provide a mechanism to allow for such an event to be generated. It should be noted that this may cause compatibility problems. This section identifies the X event that fall into the Colormap State Notification category and discusses how the translation layer 12 will map the event. There is only one colormap state notification event and it is: ColorMapNotify. The event, EvtPaletteChanged, is generated by the "WINDOWS" front end 14 whenever an "X WINDOWS" application wants information about when a colormap changes and when it is installed or removed. The translation layer 12 uses the information supplied by the event to form an XColormapEvent. The PALETTECHANGEDDATA structure is shown immediately herein below.

```
//
// Palette changed
//
typedef struct_PALETTECHANGEDDATA {
```

-continued

```
HWND       hWnd;         // Window
BOOL       bSendEvent;   // TRUE if this came from
                         SendEvent
HPALETTE   hpalWin;      // Palette handle
}PALETTECHANGEDDATA;
```

This section identifies the X events that come under the heading of Client Communication and discusses the mapping policy used by the translation layer 12 for each event. There are five client communication events in this category and they are: ClientMessage, PropertyNotification, SelectionClear, SelectionNotification, and SelectionRequest.

The X event, ClientMessage, is generated when an "X WINDOWS" application makes a SendEvent request. The translation layer 12 handles the SendEvent request and produces the X event independent of the "WINDOWS" front end 14. The translation layer 12 does not try to interpret the contents of the request. Instead it repackages the request into a ClientMessage event.

The X event, PropertyNotify, is generated by the translation layer 12 whenever an "X WINDOWS" application wants information about property changes for a specific window. The translation layer 12 does not communicate with the "WINDOWS" front end 14 for property operations and operates independently of the it, except for the following properties: WM_NAME, WM_HINTS, WM_NORMAL_HINTS. For these properties, the translation layer 12 win submit one of the following requests: ReqSetWindowText, ReqGetWindowText, ReqChangeWindowAttributes or ReqGetWindowAttributes. The translation layer 12 will submit a PropertyNotify event to the "X WINDOWS" application AFTER sending either the ReqSetWindowText or ReqGetWindowAttributes request to the "WINDOWS" front end 14.

The particular error reported to the translation layer 12 from the "WINDOWS" front end 14 depends on which X request was being processed. Table IX shows the relationship between a CPQ error and an X error.

TABLE IX

| X Error | CPQ Error |
|---|---|
| BadAccess | TBD |
| BadAlloc | ErrNotEnoughMemory |
| BadAtom | N/A |
| BadColor | TBD |
| BadCursor | ErrInvalidCursorHandle |
| BadDrawable | ErrInvalidBitmapHandle or ErrInvalidWindowHandle |
| BadFont | ErrInvalidFontHandle |
| BadGC | ErrInvalidGCHandle |
| BadIDChoice | TBD |
| BadImplementation | N/A |
| BadLength | N/A |
| BadMatch | TBD |
| BadName | N/A |
| BadPixmap | ErrInvalidBitmapHandle |
| BadRequest | ErrInvalidRequest |
| BadValue | ErrInvalidParameter |
| BadWindow | ErrInvalidWindowHandle |

"WINDOWS" does not support the concept of plane masks. The "WINDOWS" front end assumes a planemask of all ones for all drawing operations. However, if this proves invalid for a particular drawing operation, then X code for handling planemask operations is invoked. Planemask routines are located in a DLL on the personal computer. It should be noted at this juncture that an application that requires a planemask composed of some combination other than all ones will probably run much slower than an application using the default value of all ones.

CPQ server 10 will only allow one client to own a window and have access to the event mask. Under X multiple clients can access a given window each having their own event mask. CPQ server 10 will support only those pixmaps that are the exact same depth as the screen. On some display hardware, it may be possible to deal with color resources in more than one way. Under "X WINDOWS", these different ways of dealing with the visual aspects of the display hardware are called visuals. Because personal computer display hardware support for multiple color representations is either nonexistent or minimal, the CPQ server 10 will only support one visual per PC display hardware. An "X WINDOWS" transient window is mapped to an "MICROSOFT WINDOWS" popup with a parent. The concept of a root window is not present under "MICROSOFT WINDOWS". Programmatically it is used in X to identify top-level windows and visually to give the user an interesting background on his screen. Properties can be placed on the root window by the application. Under the CPQ server 10, the translation layer 12 will handle root window property operations and use the root window ED for identifying windows that are created as top-level windows. The "WINDOWS" front end 14 does not support a visible root window on the personal computer because of the additional code needed and because it does not fit well within the "MICROSOFT WINDOWS" paradigm.

What is claimed as my invention is:

1. A computer system for disparate environments, wherein an application is executing in said first windowing environment, the computer system comprising:

a network, including a plurality of personal computers and means for connecting said plurality of personal computers together in a manner which enables communications there between;

said plurality of personal computers including at least one personal computer of a first type operating in a first windowing environment and one or more personal windowing computers of a second type operating in a second windowing environment;

a translation layer receiving replies and providing requests according to said first windowing environment and providing requests and receiving replies according to an intermediate format and a front end compatible with said second windowing environment and communicating with said translation layer, said front end receiving replies and providing requests according to said intermediate format and receiving requests and providing replies according to said second windowing environment, wherein said translation layer comprises:

first protocol interface means for interfacing said first windowing environment in accordance with a first protocol;

first means for converting a plurality of requests from said application in said first windowing environment into a corresponding plurality of requests of said intermediate format;

second means for converting a plurality of replies in said intermediate format from said front end into a corresponding plurality of replies for said first windowing environment;

third means for converting a plurality of event codes in said intermediate format from said front end into a corresponding plurality of event codes for said first windowing environment;

fourth means for converting a plurality of error codes in said intermediate format generated by said front end into a corresponding plurality of error codes for said first windowing environment; and second protocol interface means for interfacing to said front end in accordance with an intermediate protocol.

2. The computer system according to claim 1, wherein said translation layer comprises means for emulating an X server.

3. The computer system according to claim 1, wherein said translation layer executes as a daemon on said at least one personal computer of said first type.

4. The computer system according to claim 1, wherein said translation layer comprises a plurality of mapping routines.

5. A computer system for disparate environments, comprising:

a network including a plurality of personal computers and means for connecting said plurality of personal computers together in a manner which enables communications there between;

said plurality of personal computers including at least one personal computer of a first type operating in a first windowing environment and one or more personal windowing computers of a second type operating in a second windowing environment;

a translation layer receiving replies and providing requests according to said first windowing environment and providing requests and receiving replies according to an intermediate format and a front end compatible with said second windowing environment and communicating with said translation layer, said front end receiving replies and providing requests according to said intermediate format and receiving requests and providing replies according to said second windowing environment, wherein said front end comprises:

network interface means for interfacing between said translation layer and said second window environment;

means for parsing and dispatching;

first report means for reporting events developed by said second windowing environment; and second report means for reporting errors in requests from said translation layer.

6. The computer system according to claim 5, wherein said network interface means comprises:

sequencing means for receiving a network packet and breaking said network packet into a sequence of tasks and performing said sequence in an optimized manner.

7. The computer system according to claim 6, wherein said sequencing means comprises a finite state machine.

8. A server, comprising:

a network, including a plurality of personal computers and means for connecting said plurality of personal computers together in a manner which enables communications there between;

said plurality of personal computers including at least one personal computer of a first type operating in a UNIX windows environment and one or more personal computers of a second type operating in a DOS windows environment;

an application executing in said UNIX windows environment;

a translation layer receiving replies and providing requests according to said first windowing environment and providing requests and receiving replies according to an intermediate format, including:

first protocol interface means for interfacing to said UNIX windows environment in accordance with an X11R4 protocol;

first means for converting a plurality of requests from said application in said UNIX windows environment into a corresponding plurality of requests in said intermediate format;

second means for converting a plurality of replies in said intermediate format from said front end into a corresponding plurality of replies for said UNIX windows environment;

third means for converting a plurality of event codes in said intermediate format from said front end into a corresponding plurality of event codes for said UNIX windows environment;

fourth means for converting a plurality of error codes in said intermediate format generated by said front end into a corresponding plurality of error codes for said UNIX windows environment; and second protocol interface means for interfacing to said front end in accordance with an intermediate protocol; and a front end compatible with said DOS windows environment and communicating with said translation layer, said front end receiving replies and providing requests according to said intermediate format and receiving and providing replies according to said second windowing environment, said front end including:

network interface means for interfacing between said translation layer and said second windowing environment, said network interface means including:

sequencing means, including a finite state machine, for receiving a network packet and breaking said network packet into a sequence of tasks and performing said sequence in an optimized manner;

means for parsing and dispatching;

first report means for reporting events developed by said DOS windows environment; and second report means for reporting errors in requests from said translation layer.

9. The computer system according to claim 8, wherein said translation layer comprises means for emulating an X server.

10. The computer system according to claim 8, wherein said translation layer comprises executes as a daemon on said at least one personal computer of said first type.

11. The computer system according to claim 8, wherein said translation layer comprises a plurality of mapping routines.

\* \* \* \* \*